US 6,650,343 B1

(12) United States Patent
Fujita et al.

(10) Patent No.: US 6,650,343 B1
(45) Date of Patent: Nov. 18, 2003

(54) ELECTRONIC INFORMATION DISPLAYING METHOD, ELECTRONIC INFORMATION BROWSING APPARATUS AND ELECTRONIC INFORMATION BROWSING PROGRAM STORING MEDIUM

(75) Inventors: Takushi Fujita, Akashi (JP); Toru Kamiwada, Akashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/407,376

(22) Filed: Sep. 28, 1999

(30) Foreign Application Priority Data

Sep. 28, 1998 (JP) .......................................... 10-273822
Sep. 16, 1999 (JP) .......................................... 11-262099

(51) Int. Cl.⁷ .............................................. G06F 3/00
(52) U.S. Cl. ...................... 345/760; 345/854; 345/771; 345/839
(58) Field of Search ................................ 345/764, 760, 345/734, 736, 737, 738, 854, 839, 848, 850, 771, 775

(56) References Cited

U.S. PATENT DOCUMENTS

| | | | | |
|---|---|---|---|---|
| 5,341,466 A | * | 8/1994 | Perlin et al. ................. | 345/668 |
| 6,021,435 A | * | 2/2000 | Nielsen ....................... | 709/224 |
| 6,034,689 A | * | 3/2000 | White et al. ................. | 345/854 |
| 6,088,032 A | * | 7/2000 | Mackinlay .................. | 345/848 |
| 6,363,404 B1 | * | 3/2002 | Dalal et al. ................. | 707/513 |

OTHER PUBLICATIONS

Ken Perlin, et al., An Alternative Approach to the Computer Interface, Computer Graphics Proceedings, Annual Conference Series, 1993, pp. 57–64.
Benjamin B. Bederson, et al., PAD++: A Zooming Graphical Interface for Exploring Alternate Interface Physics, Nov. 2–4, 1994, pp. 17–26.

* cited by examiner

Primary Examiner—John Cabeca
Assistant Examiner—Kieu D. Vu
(74) Attorney, Agent, or Firm—Staas & Halsey LLP

(57) ABSTRACT

An electrgonic information displaying method and apparatus are used to comfortably browse electronic information which includes embedded link information such as hypertext by way of a display device. The electronic information is arranged in a single virtual space based on a predetermined link format. A display image which is used to read the electronic information is generated and is then displayed on the display device on the basis of the visual field defined in virtual space. Moreover, the visual field is continuously changed depending upon an instruction from a user. Furthermore, a display image based on the visual field is continuously generated in realtime basis. By way of the updating of the information in real time, the user can read the electronic information by following the link of electronic information while continuously changing the visual field within the virtual space, to thereby simulate the reading of printed matter.

58 Claims, 16 Drawing Sheets

REPRESENTATIVE DOCUMENT LAYOUT DATA

- POINTER TO DOCUMENT LAYOUT DATA OF THE REPRESENTATIVE DOCUMENT
- CONVERSION MATRIX TO THE REFERENCE PLANE COORDINATE SYSTEM FROM THE REPRESENTATIVE DOCUMENT COORDINATE SYSTEM

FIG. 8A

DOCUMENT LAYOUT DATA

- URL OF DOCUMENT DEFINITION DATA
- POINTER TO DOCUMENT DEFINITION DATA
- POINTER TO PAGE LAYOUT DATA OF LINK SOURCE PAGE
- COORDINATE CONVERSION MATRIX TO LINK SOURCE COORDINATE SYSTEM FROM THE DOCUMENT COORDINATE SYSTEM
- POINTER (LIST) TO PAGE LAYOUT DATA
- PAGE NO. OF ACTIVE PAGE
- DISPLAY PRIORITY

FIG. 8B

PAGE LAYOUT DATA

- POINTER TO DOCUMENT LAYOUT DATA
- PAGE NO.
- POINTER (LIST) TO LINK DESTINATION DOCUMENT LAYOUT DATA
- COORDINATE CONVERSION MATRIX TO DOCUMENT COORDINATE SYSTEM FROM PAGE COORDINATE SYSTEM
- POINTER TO PAGE IMAGE
- PAGE FORMAT DATA
- DISPLAY PRIORITY

FIG. 8C

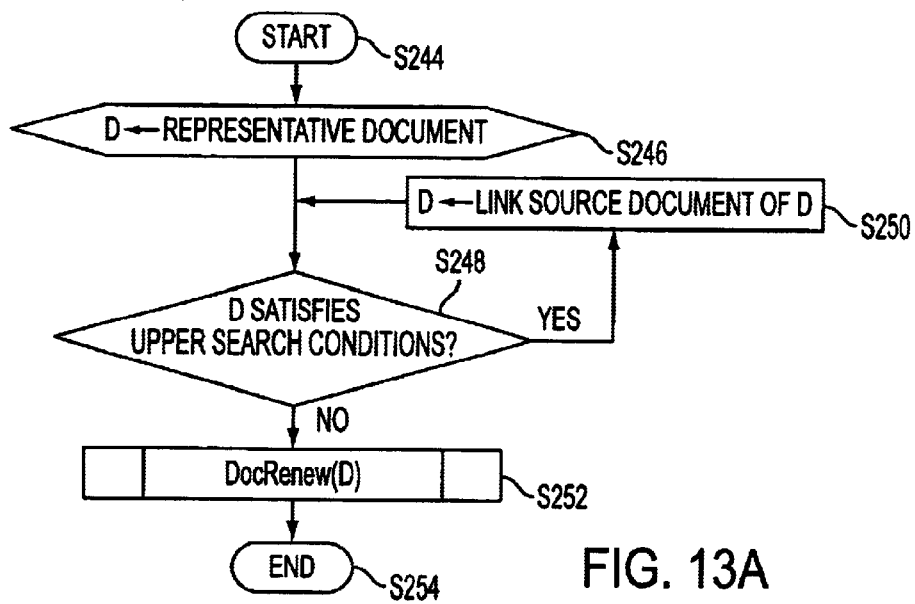
FIG. 13A
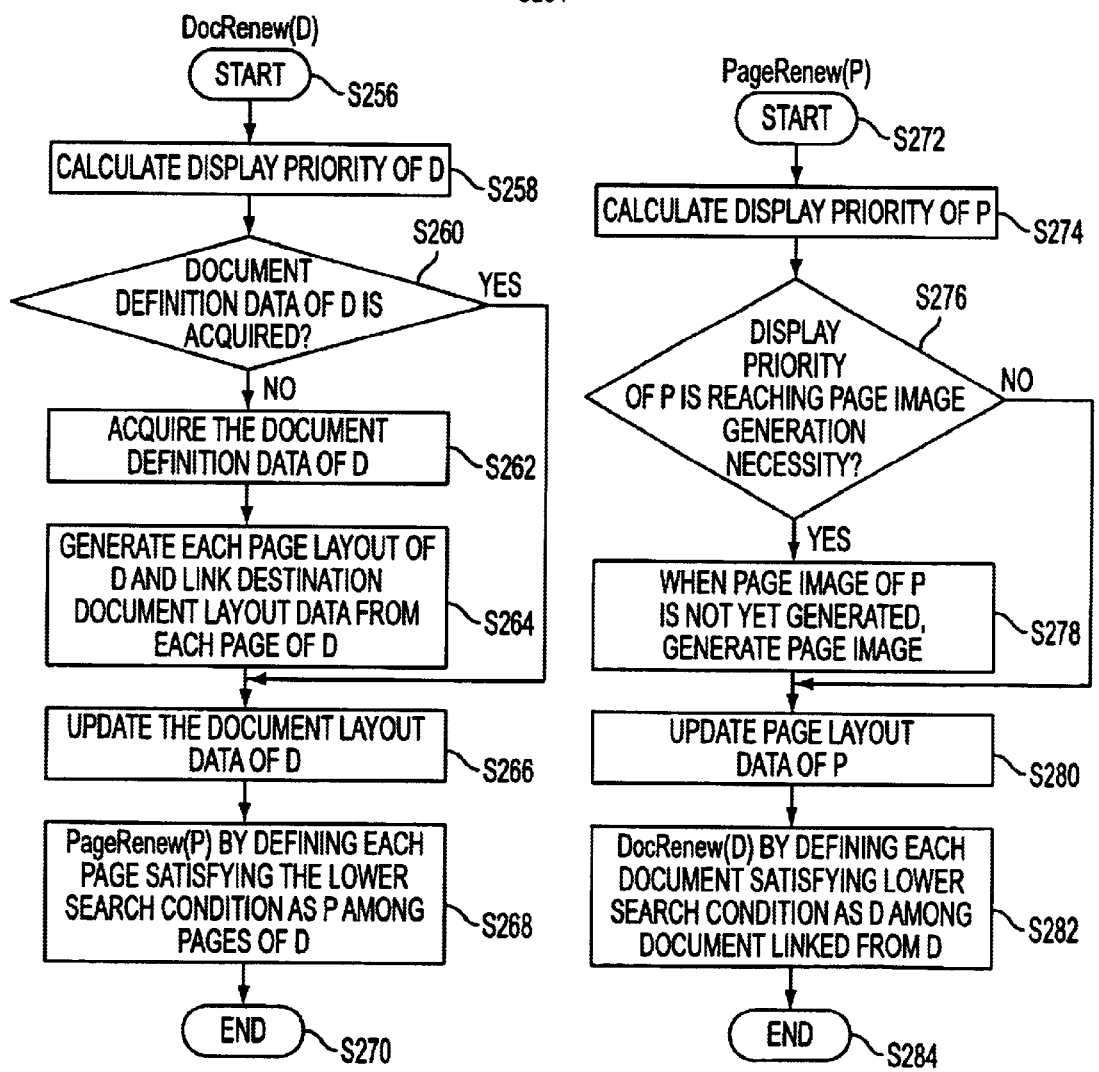
FIG. 13B
FIG. 13C

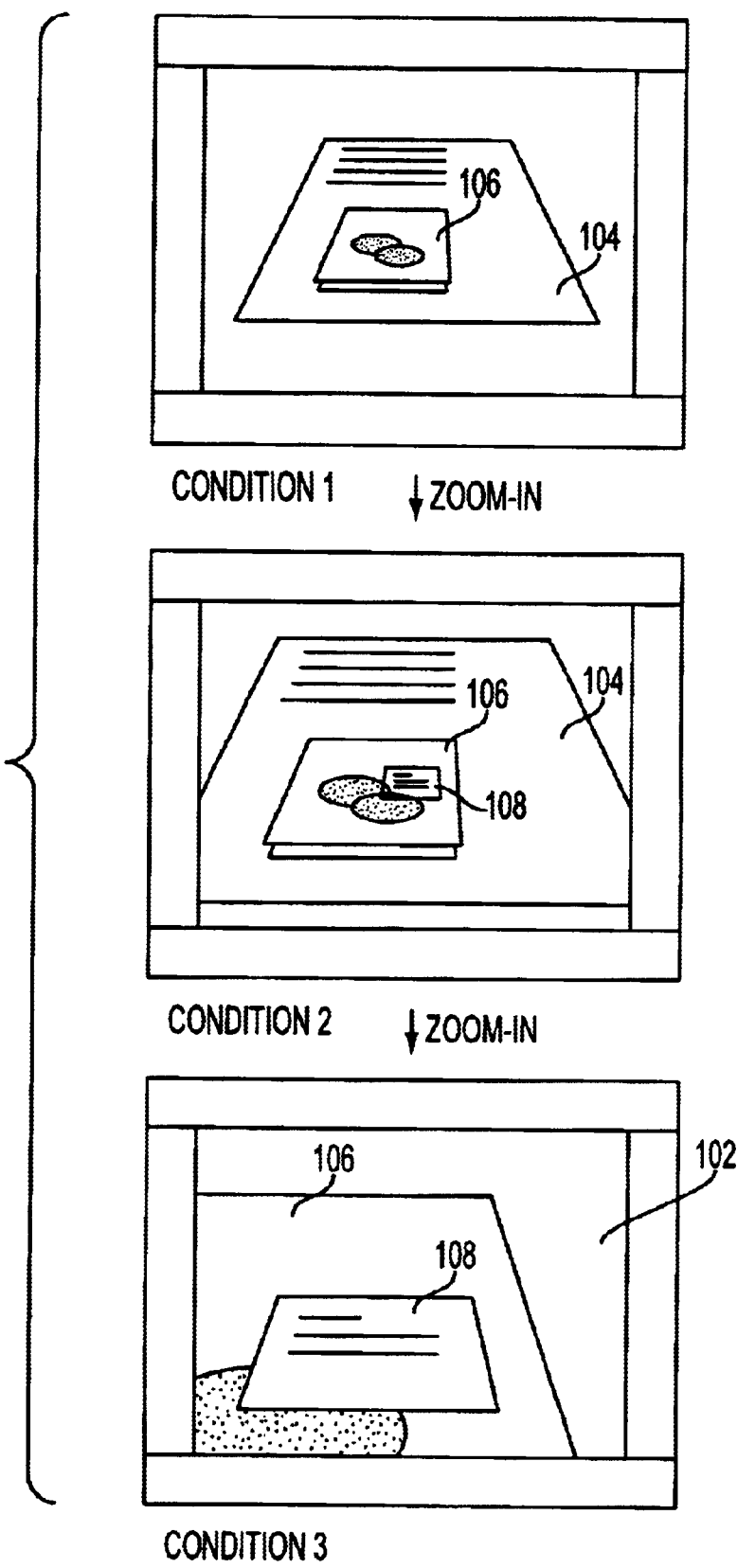

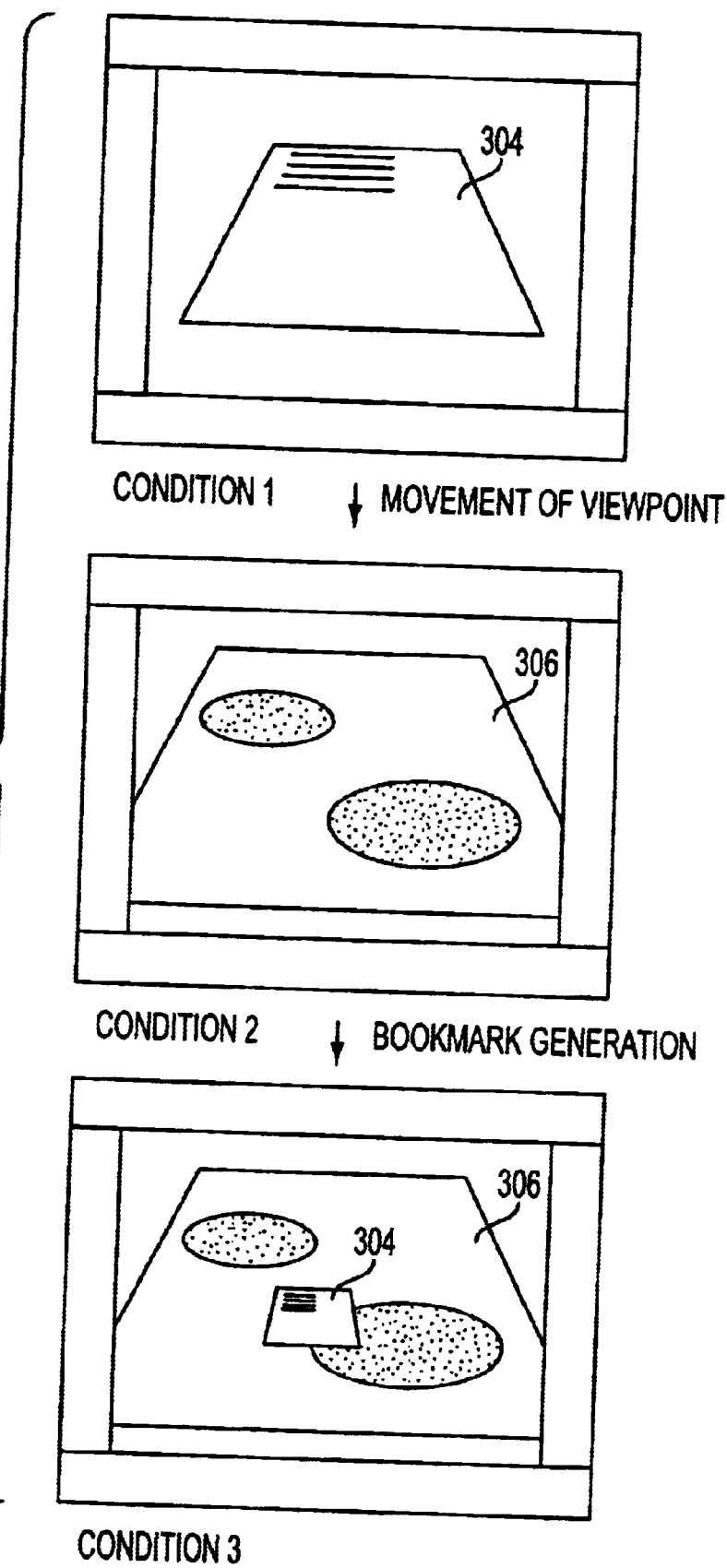

ELECTRONIC INFORMATION DISPLAYING METHOD, ELECTRONIC INFORMATION BROWSING APPARATUS AND ELECTRONIC INFORMATION BROWSING PROGRAM STORING MEDIUM

CROSS-REFERENCE TO RELATED APPLICATIONS

This application is based upon and claims priority of Japanese Patent Applications No. 10-273822 filed Sep. 28, 1998, and No. 11-262099 filed Sep. 16, 1999, the contents being incorporated herein by reference.

BACKGROUND OF THE INVENTION

The present invention relates to an electronic information displaying method and an electronic information browsing apparatus to browse through an electronic information. More particularly, the present invention relates to an electronic information displaying method and an electronic information browsing apparatus to easily browse through an electronic document having links which are defined by a hypertext format or the like.

The rate of distribution of electronic information including multimedia is increasing through networks such as the Internet, as well as data broadcasting by communication satellites and cable television, or through mediums such as CD-ROM, DVD-ROM or the like. Moreover, even in a local environment such as a person or a company, the demand for directly distributing electronically documents which are generated and edited on a computer and the demand for retrieving and browsing the contents of such documents on a display, such as a terminal unit, can be anticipated to increase in the future.

Here, electronic information is assumed to include character information, stationary images, moving images, audio signals, music information, document format information and link information.

The WWW (World Wide Web) is a current distribution mode for electronic information. In this case, electronic information is accumulated in a server which is connected throughout the world by way of the Internet. An electronic information is then transferred to a client from the server depending on a demand from a computer on the client side connected to the Internet. Thereby, contents of such electronic information is displayed on the display screen of the client computer for the convenience of browsing. In general, a software called a browser is used to display contents of the electronic information on the client computer.

HTML (Hypertext Markup Language) is mainly used as the language of choice for describing the electronic information in the WWW. HTML is a kind of language for describing hypertext (hereinafter, an electronic information described by a description language such as HTML is described as an "electronic document" or only as a "document" for the convenience of explanation).

In regard to the electronic document hypertext, a link to the other related document from the particular place in a document is defined, a document of the link destination can immediately be displayed when a user requests by designation the link information in the document. In the current HTML, it is possible to bury a stationary image, a moving image, an audio signal, music data, a program or the like and link them, in addition to the text documents.

As the browser software to read electronic documents described by HTML or the like, Netscape Navigator of Netscape Communication and Internet Explorer of Microsoft can be listed. Moreover, as the software to display an electronic document described in PDF (Portable Document Format) developed by Adobe Systems, the Adobe Acrobat Reader has been distributed from the same company.

The browser software explained above generally acquires, when a URL (Uniform Resource Locator) for defining existence of document definition data on the network is designated by a user, the document definition data indicated by such URL from the network, etc. to analyze contents of the acquired document definition data in view of forming a display image to be displayed on the screen.

A URL can be designated by a user through direct input using a keyboard or the like, or a URL which has been previously registered, such as the bookmark information, may be selected and called from a menu, etc. In addition, when a previously registered URL of an electronic document is to be displayed at the time of starting the browser, the browser acquires the document definition data indicated by the registered URL each time it is activated and then automatically displays the contents of such URL.

When a document is displayed on the display screen of the browser to define the link to the other document from the relevant document, the part for which the link is defined on the document is displayed in a different color of characters or with a display of the frame particularly colored for an icon in order clarify that the link is defined for such part. When a part corresponding to the link explained above is designated (i.e. selected) by a user with a designating means (such as mouse or the like), the browser acquires the document definition data of the link destination and displays the contents on the display screen.

In this case, an electronic document at the link destination is displayed in place of the document being displayed in the window of the browser or in the window which is newly opened.

Here, a user can read the document being displayed in the window through scrolling. Moreover, such a document can also be displayed by changing the font size. However, in general, the document is displayed in such a condition that it is adhered in the predetermined size to the display screen and therefore it is impossible to observe the document from the desired position or direction and to display the document while it is continuously expanded or compressed for the display. This point is far different from the feeling of browsing a document which is written on paper and also interferes with a comfortable feeling of browsing the electronic documents.

Meanwhile, the Adobe Acrobat Reader is software for browsing, on the computer display, a document described in PDF format, i.e. a document expressing format which may be printed to paper. This software enables browsing of a document, which is paginated like printed matter, through the step by step zooming, scrolling and page feeding. However, the feeling for browsing the these electronic documents is also far different from the feeling of browsing a book printed on paper, and such browsing cannot be said to be comfortable.

Browsing of an electronic document has mainly been conducted on the display of a desk-top type or notebook size personal computer. In the future, however, the necessity for browsing electronic documents in various conditions will be increased. For example, surely required in future is such an environment that an electronic document can be read comfortably even on the display of television receiver, for example, which may be installed in a living room or on the display of a hand-held information tool.

In the case of browsing an electronic document on the display screen of a television receiver as a home appliance, a user generally watches the television receiver in the living room maintaining a distance of several meters. Therefore, in comparison with the display of a personal computer, a virtual angle of the display screen observed by a user becomes narrow. Moreover, in the case of the hand-held information tool, there is a limitation in size of the display from the viewpoint of the hand-held property. In this case, even when display is given a higher resolution or when many characters are displayed on one display image, such a document cannot be read comfortably.

The existing browser is based on, like an ordinary computer display, use of the high resolution display screen from an area located within short distance. Namely, a document is displayed on the display screen in such a size as ordinary printed matter. Therefore, It is rather difficult to use to direct the television screen as the display screen when the television is watched in the distance of several meters and when the display area is narrow like the hand-held information tool.

However, when display of a document is magnified to enable easier browsing of characters, only a part of the document can be observed and the ease of browsing may be lowered.

In general, when a person reads a printed document, such as a newspaper, a person is often centralized to read the characters or observe the photographs of the interested portion. In this case, a person can change his consciousness continuously to the individual items from the entire part only by moving his eyes. Therefore, it is desirable to realize the same sense on the display screen.

Therefore, it may be thought that a document will be required to be displayed while it is continuously magnified or compressed. Namely, the entire part of paper is first displayed in such a size as enabling to read large headlines and photographs, and then the interested portion is continuously displayed through magnification up to the size enabling easier browsing thereof by manipulating a remote controller or the like. In this case, it is essential that display size may be changed continuously in order to attain the same sense as browsing the news paper as the printed matter.

Moreover, an electronic document displaying means such as an existing WWW browser or the like is based on manipulation using a mouse, but since the mouse is based on use on the desk, it is inconvenient to use the mouse at the area other than the desk top such as the living room or the like. When considering use under variable conditions, it is preferable to use a remote controller which may be manipulated only with a single hand. Among the personal computers which are already available in the market, a joy stick as an infrared remote controller or cursor moving button, etc. are used in place of the mouse to move the cursor on the display screen. In the browser having the user interface designed based on manipulation by the mouse, it is not comfortable to use such a remote controller for the manipulation. Therefore, a user interface applicable to manipulation by the remote controller is necessary.

In the browser based on the existing mouse, when the mouse cursor is assigned to the part where the link is defined among the document being displayed and it is then clicked, the linked document is then displayed in place of the current document. One of the general problems of this method is that since the part where the link is defined in the document is considerably small, it is not easy to realize manipulation on the display screen being isolated from a user, or to move and select the cursor by manipulation of a remote controller. In order to solve this problem, it is essentially required to provide a user interface which can easily realize going up to the link destination even with rough remote controller manipulation.

Another problem of the existing browser is that the currently displayed document disappears when the link is clicked, and thereby, a displayed page is jumped to the document page of the link destination and thereby spatial continuity is interrupted. With this discontinuity, a problem arises that a user cannot detect that a page of the linked document being read will be generated.

In order to solve the problems explained above, it is thought to propose a method to define a virtual space similar to the single and continuous three-dimensional space in which a person is living with familiarity in view of recognizing the current place of a person as the spatial position. In the electronic document browsing environment, a document is distributed to such single and continuous space to reach the desired document through the continuous spatial movement. For this purpose, it is required to move to the link destination without any jump.

In the browser of the related art, the desired position of the document is displayed by scrolling display contents of the window in regard to a long document which cannot be accommodated within the window. However, it is difficult during the scrolling to read the document because display contents moves at a high speed and it is not comfortable to read a longer document by scrolling. Moreover, since the position where a certain information is displayed among the display page is not constant when the scrolling is stopped, it is difficult to memorize the position of information among the position on the page.

In order to solve this problem, there is proposed a document browsing method in which a document similar to a book, as a printed matter, is displayed on the display of a personal computer, etc. and then browsing can be realized while changing over the pages. Currently however, the sense of changing over the pages is far different from that of a book, and it is also impossible to search the items by sequentially changing over the pages of a magazine. In order to realize more comfortable browsing, it is essential to realize the sense which is further similar to that of the printed matter.

The U.S. Pat. No. 5,341,466 by Kenneth Perlin and Jacob Schwartz discloses a user interface technology in which at least one two-dimensional reference plane is defined. Information accumulated within the computer is expressed by the representation object arranged by defining position and scale on the reference plane, and a part of the reference plane is displayed through magnification and compression thereof with two dimensional zooming.

In the above U.S. Pat. No. 5,341,466, since an individual information expression format is used, the information in which a mutual relationship can be defined by the hierarchical link, such as a directory of a computer and the WWW (which are the existing information expressing format) cannot be dealt without any modification. In the present invention, there is provided a means for browsing, by continuously following the link, the information in which a mutual relationship is defined by the hierarchical link to the other information from a certain information, namely the information of the so-called hypertext format, which is the general information expressing method from the related art.

In U.S. Pat. No. 5,341,466, all objects are arranged on a reference plane by defining the position and scale for the reference plane and a hierarchical relationship is not defined between these objects. However, the information such as an electronic document can be processed easily in many cases by defining the hierarchical relationship between objects. For example, when a highly ranked object is moved regarding a plurality of objects which are in the hierarchical relationship in the meaning, the lower ranked objects have to be moved depending on such highly ranked objects. Since the hierarchical relationship is not defined in U.S. Pat. No. 5,341,466, such a process is impossible.

In U.S. Pat. No. 5,341,466, the object itself and the reference plane in which the objects are arranged are limited to two-dimensions and an image displayed on the display screen displays in two dimensions in direct a part of the reference plane. However, for a greater understanding of information and for enabling expression of electronic information of variable mode, it is more preferable to execute a three-dimensional arrangement of the positional relationship of the information and to change in three dimensions the field of vision.

In U.S. Pat. No. 5,341,466, a means for displaying information which is not previously accumulated in the computer is not disclosed. However, on the occasion of browsing the WWW, information must be acquired from a network outside the computer, depending on necessity. In the case of a WWW browser of the related art, such as Microsoft Internet Explorer and Netscape Navigator, information at the link destination has been obtained when the mouse is clicked at the position where there is a link on the document. In the case of browsing the WWW using the zooming function, information as the display object must be obtained from the outside of computer depending on the zooming manipulation.

In U.S. Pat. No. 5,341,466, position and scale of each object for the reference plane must previously be defined. However, in the information of the format existing previously such as hypertext on the WWW and a directory of a computer, position and size for the reference plane are not previously defined in many cases and only the link to the other document from the document as the link source is defined. In the case of the WWW, the link to the other document from the particular area on the link source document is defined. In order to read such information through the zooming function, a means for determining the position and scale of the link destination document for the link source document is necessary.

BRIEF SUMMARY OF THE INVENTION

It is therefore an object of the present invention to solve the problems explained above.

To solve the problems explained above, several pieces of electronic information are arranged, in the present invention, within a virtual space on the basis of link information defined in a document defining data such as electronic information, etc. The field of vision is defined to observe the inside of space, and an image of the virtual space including electronic information is generated based on such field of vision, and is then displayed on the display apparatus. Moreover, relative positional relationships between the electronic information and the field of vision in the virtual space is continuously changed on the basis of a user's instruction. An image based on such field of vision is then continuously generated on the real time basis and it is then displayed on the display apparatus. Therefore, a user is capable of reaching the electronic information in which the link of the hypertext format or other link definition formats is extended and browsing through the magnified or reduced display while continuously moving the field of vision in the virtual space.

In order to realize the environment explained above, an electronic information browsing apparatus can be realized with the structure illustrated in FIG. 1. As set forth below, each drawing of the present specification corresponds to an embodiment for processing an electronic document described by a hypertext language such as HTML and therefore electronic information is described as an electronic document or only as a document.

This apparatus includes an electronic information definition data acquiring means, an electronic information definition data storing means, an electronic information definition data storing means, an electronic information definition data management means, an electronic information definition data analyzing means, a page image generating means, a page image storing means, a display image generating means, a display image storing means, an image output means, a user instruction accepting means, an electronic information layout information storing means, an electronic information layout information generating and updating means, a visual field information storing means and a visual field information updating means.

In above structure, the electronic information definition data acquiring means acquires the electronic information definition data from the network such as the Internet, broadcast, or another information transfer medium or information storing medium.

The electronic information definition data storing means stores the electronic information definition data acquired by the electronic information definition data acquiring means or the electronic information definition data generated on the present apparatus.

The electronic information definition data storing means temporarily stores the electronic information definition data for the purpose of making reference from the electronic information definition data analyzing means and page image generating means, etc.

The electronic information definition data management means performs management and distribution of electronic information definition data required by the other modules such as management of electronic information definition data to be stored in the electronic information definition data storing means and acquisition of electronic information definition data via the electronic information definition data acquiring means.

The electronic information definition data analyzing means analyzes the electronic information definition data and acquires the information to be used for generation of page image and generation of document layout information.

The user instruction accepting means is formed of an input device such as remote controller or the like, an interface means for such input device and a software or the like in order to accept a user's instruction and transfer it to the other module. The electronic information layout information storing means stores the electronic information layout information for defining information regarding layout in the virtual space of the electronic information linked by the hypertext structure.

The electronic information layout information generating and updating means generates the electronic information layout information based on the analysis result of the electronic information definition data and also updates the electronic information layout information depending on change of visual field information.

The visual field information storing means stores the visual field information to define the area as the object for generation of a display image in the virtual space.

The visual field information updating means updates the visual field information based on the user's instruction accepted by the user instruction accepting means.

The page image generating means generates image of each page of the electronic information using the electronic information definition data and its analysis result.

The page image storing means stores temporarily the page image generated by the page image generating means.

The display image generating means continuously generates the display image based on the electronic information layout information and visual field information.

The display image storing means temporarily stores the display image generated by the display image generating means. The image output means continuously outputs the display image stored in the display image storing means.

With the structure explained above, electronic information having the hypertext structure is arranged in the virtual space, the image which has observed the inside of the space based on the defined visual field is displayed on the display device and a user is capable of reaching the electronic information by following the link while continuously moving the visual field within the space and also browsing the electronic information while virtually changing the appearance.

Moreover, the electronic information browsing apparatus of the present invention may introduce the structure explained below.

In addition, the electronic information browsing apparatus of the present invention may introduce the following structure. Moreover, the virtual space explained above should be the three dimensional space and the visual field information updating means changes continuously in three dimensions the positional relationship between the visual field and electronic information based on user's instruction and thereby the display image generating means generates the display image which changes continuously on the realtime basis. Therefore, the display image generating means is provided with a means for drawing the page on which a page image is adhered on the display image through the high speed perspective transformation.

With this structure, an image of smooth moving in such a case that the visual field is continuously moved in the virtual three dimensional space may be displayed.

The electronic information layout information generating and updating means determines, on the basis of the analysis result of electronic information definition data by the electronic information definition data analyzing means, the relative position of the electronic information at the link destination for electronic information or the page at the link source in the virtual space and also generates, based on this position, the electronic information layout information and the electronic information layout information memory means stores its electronic information layout information.

With this structure, the relative positional relationship between linked pieces of electronic information in the virtual space can be determined automatically from the electronic information definition data.

The electronic information layout information generated by the electronic information layout information generating and updating means may be determined to define the electronic information layout in which the electronic information of link destination, for example, is arranged in small size at the area before the electronic information of the link source. FIG. 4 illustrates an example of generation of the display image based on such electronic information layout information.

With this structure, the electronic information of link destination is arranged through compression before the electronic information of the link source and is then displayed on the display area.

As the other realizing method of the electronic information layout information generated by the electronic information layout information generating and updating means, it is also possible to layout the electronic information in the link destination in small size behind the electronic information of the link source. In this case, the display image generating means displays through semi-transparency the electronic information of the link source depending on change of visual field and thereby the electronic information of the link destination may be observed through such information of link source.

With the structure explained above, the electronic information of the link source may be arranged through compression in the deeper side of the electronic information of the link source and thereby the deeper electronic information can be displayed on the display area through the before hand electronic information.

Regarding the electronic information defined to be composed of a plurality of pages in the electronic information defining data and the electronic information which cannot be displayed within a page, display is performed in the similar manner to that of a book including a plurality of pages and the electronic information layout information generating and updating means may be formed, in order to realize the display explained above, to generate the electronic information layout information including the information to define the page layout in the electronic information in the virtual space explained above. In this case, an example of a display image is illustrated in FIG. 5.

With the structure explained above, display similar to that of the book including a plurality of pages is performed for the electronic information not accommodated in one page.

In the electronic information layout information explained above, the absolute coordinate of each electronic information in the virtual space is never defined but it is possible to introduce the structure to define the relative positional relationship of the electronic information of the link destination for the electronic information of link source or the page for all links between electronic information. Thereby, relative positional relationship of all linked electronic information and pages can be established. Moreover, only one electronic information among these information is selected as the representative electronic information and the relative positional relationship between the visual field and representative electronic information can be defined as the visual field. Thereby, the relative positional relationship between the all electronic information linked and visual field can be established. FIG. 7 illustrates an example of such data format and FIGS. 8A, 8B, and 8C illustrate an example of items of data described in FIG. 7.

With this structure, a geographical relationship among electronic information can be defined for each link between the electronic information and moreover only one of the electronic information is selected as the representative electronic information and the geographical relationship of all electronic information combined by the link can be defined with reference to the representative electronic information.

FIGS. 9A and 9B are diagrams for explaining a definition of a positional relationship between the visual field and electronic information in the virtual three-dimensional space as explained above.

First, viewpoint coordinate system is defined in the three-dimensional space and viewpoint is defined to exist at the position of origin. The visual field, namely area displayed on the display area is projected, in regard to the viewpoint explained above, to the virtual display area fixed on the viewpoint coordinate system. When the virtual display area is formed as the rectangular shape, the visual field is defined as the area of pyramid.

In FIGS. 9A and 9B, the X, Y, Z axes of the viewpoint coordinate system are indicated by vectors vx, vy, vz. The virtual display area is formed as the rectangular shape placed in parallel to the XY plane and its center is located on the Z axis. Therefore, in this case, the point corresponding to the center of display area, namely the gaze point is located on the Z axis of the viewpoint coordinate system in the virtual space.

In the same space, the reference plane and reference plane coordinate system are defined. Here, the reference plane is assumed to be fixed in the reference plane coordinate system. For example, the XY plane of the reference plane coordinate system is assumed to be matched with the reference plane. Moreover, the electronic information coordinate system is defined for each electronic information arranged in the three-dimensional space. In addition, the page coordinate system is also defined for each page included in each electronic information.

Change of visual field for the electronic information is realized by changing the geographical relationship of the reference plane coordinate system for the viewpoint coordinate system, while the geographical relationship between the reference plane coordinate system and electronic information coordinate system of each electronic information are fixed.

Here, it is assumed in the initial condition that the representative electronic information is determined and position of representative electronic information in the viewpoint coordinate system is also established. The reference plane coordinate system is determined with reference to the position of representative electronic information. Determination is made so that the page plane, for example, of the representative electronic information is almost matched with the reference plane and the representative electronic information as a whole is accommodated in the range of the standard coordinate value in the reference plane coordinate system, for example, in the range of −1.0 to 1.0.

In actual, in the case where the reference plane coordinate system is set in such a manner as being matched with the information coordinate system of electronic information selected as the representative electronic information on the occasion of previously defining each electronic information coordinate system, when each electronic information coordinate system is defined to satisfy the reference explained above, the electronic information coordinate system of the representative electronic information can be defined in direct as the reference plane coordinate system and therefore procedures for determining the reference plane coordinate system can be saved.

The geographical relationship between the reference plane coordinate system and representative electronic information coordinate system is determined when a new representative electronic information is determined and it is never changed while such electronic information is the representative electronic information.

With introduction of such structure, the reference place coordinate system which has established the geographical relationship is defined for the coordinate system of the representative electronic information and change of visual field can be realized by changing the geographical relationship of visual field for the reference plane coordinate system. Moreover, when the representative electronic information is changed, the reference plane coordinate system can be determined automatically based on the position of a new representative electronic information.

In the system explained above, in order to assure excellent accuracy and efficiency of the display process, a means for determining the representative electronic information most suitable to assure the representative electronic information among the linked electronic information and a means for changing the representative electronic information depending on such determination are provided to change the representative electronic information to always select the optimum representative electronic information. The representative electronic information as the optimum representative electronic information should enable easily reaching all electronic information to be displayed within the display area and should have the standard value as the scale for the visual field.

With this structure, the representative electronic information may be changed automatically to maintain excellent accuracy and efficiency for the display process.

In a method for determining the representative electronic information, the condition for shifting a candidate of representative electronic information to the electronic information in the link source or link destination from the current representative electronic information candidate, when the current representative electronic information is defined as the representative electronic information candidate and the condition to shift such representative electronic information candidate to the electronic information in the link source or link destination is established, the representative electronic information candidate is shifted depending on the conditions, the same process is repeated for a new representative electronic information and when the representative information candidate is no longer shifted, such representative electronic information candidate is established as the representative electronic information.

According to this structure, the representative electronic information is automatically determined on the basis of the representative electronic information selecting condition.

In order to maintain continuity in the shifting of visual field, it is necessary to suppress generation of non-continuous change of display area even when the representative electronic information is changed. On the other hand, in order to keep accuracy of arithmetic process, geographical relationship between the viewpoint coordinate system and reference plane coordinate system, coordinate system of the representative electronic information must be accommodated within the constant range. For this purpose, when the representative electronic information is changed, the geographical relationship of the reference plane coordinate system for the viewpoint coordinate system is normalized without virtual change of display area. In more practical, after the representative electronic information is changed and relationship between the representative electronic information coordinate system and reference plane coordinate system is established, the geographical relationship of the reference plane coordinate system for the viewpoint coordinate system is magnified or compressed centering around the viewpoint so that the distance up to the noted gaze point on the reference plane from the viewpoint in the viewpoint coordinate system becomes equal to the predetermined reference distance (for example, 1.0). As a result, all objects in the space are likely magnified or compressed centering around the viewpoint while virtual change of display on the display area is never conducted. After the representative electronic information is changed and normalized as explained above, continuous change of the visual field of the display area can be realized by continuously changing the visual field information to define the geographical relationship between the visual field and reference plane.

With introduction of the structure explained above, the information for defining geographical relationship between the reference plane coordinate system and visual field can be normalized while virtual change of display area is never conducted.

Here, the visual field information includes, as the parameters, the noted viewpoint position on the reference plane, rotating angle of the reference plane passing the gaze point on the reference plane and considering the straight line vertical to the reference plane as the axis, tilt angle for defining rotation of the reference plane passing the noted gaze point on the reference plane and considering the straight line parallel to the horizontal direction of virtual display area as the axis, scale ratio of the reference plane coordinate system for the viewpoint coordinate system and visual field angle.

A set of above parameters is effective to fix the distance up to the noted gaze point on the reference plane from the viewpoint in the viewpoint coordinate system, but the similar effect can be obtained on the display area even by fixing the scale ratio and then changing, as the parameter, the distance, in place of it, up to the noted gaze point on the reference plane from the viewpoint.

When the visual field information is defined as explained above, relationship between the reference plane coordinate system and viewpoint coordinate system is defined by parameters and the visual field can be changed by changing this parameter.

Here, it is also possible to provide the structure that change during the unit time is proportional to the distance, in order to make constant a degree of change of visual field which a user feels, up to the noted gaze point on the reference plane from the viewpoint with reference to the viewpoint coordinate system, regarding the noted viewpoint position on the reference plane among the parameters explained above.

The viewpoint information updating means continuously updates parameters of visual field information explained above on the basis of user instruction accepted by the user instruction accepting means, while the display area generating means generates continuously the display area using visual field information, electronic information layout information and page image. A user issues an instruction for shifting the visual field with a remote controller while verifying the display area and reads the electronic information by shifting the visual field.

According to this structure, virtual shifting speed of electronic information on the display area can be kept almost constant.

In order to display an electronic information including a plurality of pages like a book, the electronic information layout information is provided with a page coordinate system for each page of the electronic information in view of defining the geographical relationship of the page coordinate system for the electronic information coordinate system.

The user instruction accepting means accepts the instruction for turning the pages from a user and the electronic information layout information generating and updating means changes, when a user has issued the instruction to turn the page, the geographical relationship of the page coordinate system for the electronic information coordinate system.

In the electronic information including a plurality of pages like a book, the geographical relationship of the electronic information coordinate system of the information of link destination for the page coordinate system of the link source page should be defined in the electronic information layout information in order to arrange the compressed link destination electronic information on the link information of each page.

With the structure explained above, display for turning the page on the display area may be realized for the electronic information including a plurality of pages.

The electronic information definition data having the hypertext structure existing on the network or the like is thought to be linked endlessly and therefore it is required to acquire only the necessary electronic information definition data from such data for preparation of display and actual display operation.

For this subject, the electronic information layout information generating and updating means and display image generating means are provided with the link search condition and link search condition determining means. The link search condition determines the condition for continuation of link search on the occasion of following the link in the link source direction or in the link destination direction. Moreover, as the data items of electronic information layout information, the electronic information display priority and page display priority are also provided.

The electronic information layout information generating and updating means follows the electronic information layout information depending on the link search condition to obtain the electronic information definition data required for generation and update of the electronic information layout information and the result of analysis of such data in order to generate and update the electronic information layout information. In this case, the electronic information layout information generating and updating means calculates display priority of the electronic information and page on the basis of the geographical relationship for the visual field and then updates the electronic information layout information.

The page image generating means refers to the electronic information layout information and when the display priority of electronic information and page becomes highest, it generates the page image on the basis of the electronic information definition data and result of its analysis and the page image storing means stores the generated page image. The electronic information definition data explained above reads the data stored in the electronic information definition data storing means or acquires the data via the electronic information definition data acquiring means. In the case where the electronic information definition data is used from the electronic information definition data analyzing means or page image generating means, the electronic information definition data storing means may be used as illustrated in FIG. 1.

The display image generating means sequentially follows the link of the electronic information layout information based on the link search condition and determines whether each electronic information or page should be displayed or not based on the electronic information display priority and page display priority and also generates the display image depending on such display priority. In more practical, threshold value of display priority is provided and drawing is performed on the display image only for the electronic information and page having the display priority higher than the threshold value.

According to this structure, only the data related to display is acquired from the electronic information definition data linked by the hypertext structure on the network considered to have endless link structure and preparation for display and actual display are conducted.

Regarding the electronic information or page to be displayed in the display image generating means, half-transparent display is conducted for the electronic information having the display priority lower than the predetermined reference value and the half-transparent display is conducted by increasing the transmissivity for the information having lower display priority.

According to this structure, with change of display priority of electronic information due to the shifting of the visual field, display condition is changed from the transparent and invisible condition because the display priority is lower up to the non-transparent and perfect visible condition because display priority is higher.

In view of realizing effective display image generation even if virtual size of the electronic information or page on the display image is changed due to the change of visual field information, the page image generating means is provided with a means for generating page images in a plurality of different resolution for one page. Thereby, when the page image is generated, the page images of a plurality of different resolution are generated and are then stored in the page image storing means. While, the display image generating means selects the page image of the resolution enabling generation of a display image in the highest efficiency for the use in the generation of the display image.

According to this structure, the page image in the resolution enabling the most efficient image generation in the display image generation is selected for use in the image generation.

The electronic information definition data as the display object is not limited to stationary data and may be the data, for example, to define the dynamic content like a program. In this case, the page image generating means updates temporarily the page data depending on definition of the electronic information definition data.

Moreover, it is also possible that the electronic information definition data itself is not acquired from the outside and it is generated dynamically with a program included within the browsing apparatus.

According to this structure, the electronic information having dynamic content may be displayed.

In addition, the electronic information definition data generating and editing means is provided so that a user can generate book mark data and electronic information definition data by re-arrangement of link to the existing electronic information. The electronic information definition data generated by user is stored in the electronic information definition data storing means for management with the electronic information definition data management means.

With this structure, a user can generate and store a bookmark and other electronic information definition data.

In order to realize the display of smooth movement during the shift of viewpoint or operation for turning the page in the display image generation by the display image generating means, generation of a display image of 30 frames per second or more is required. In order to satisfy this condition, electronic information and page having higher display priority is displayed precedingly and only the content of the range enabling generation of a display image in the display frame rate required depending on the condition is displayed. In one practical method, the frame image generating target time is set first, a forecasted value of drawing time required for drawing of electronic information is obtained for each electronic information stored in the electronic information layout information storing means, such forecasted values are accumulated in the sequence of higher display priority, threshold value of display priority is determined so that the accumulated value becomes less than the frame image generation target time and only the electronic information and page having the display priority higher than the threshold value are drawn.

In the other method, image generating time of immediately preceding frame is measured, a ratio of frame image generating time measured value for the frame image generating target time is obtained and the threshold value for suspending drawing due to the display priority is increased or decreased so that the next frame image generating time can be accommodated within the target time. In more practical, when the measured value is larger than the target time, threshold value is increased, but when the measured value is smaller than the threshold value, the threshold value is decreased.

The frame image generating target time is preferably changed depending on the condition. In more practical, during sifting of the visual field and operation for turning the pages, the frame image generation target time is set short to enable smooth generation of a moving image and when visual field is not shifted or operation for turning the pages is not conducted, the target time is set longer.

With the structure explained above, when display content changes quickly, display considering first the smooth movement is performed and when display content is rather lower, the frame display image generation time is set longer to realize the display of higher fidelity.

When a display image is generated in the display image generating means, if page image of electronic information to be drawn on the display image is not yet prepared on the page image storing means, the display image generating means does not adhere the page image for the relevant page and performs the simplified display such as the display of only the page mode.

The electronic information has been explained as the display object but three-dimensional cubic material and desired object may be selected as the display object in place of the electronic information.

According to this structure, even if preparation for page image is still insufficient, display considering first the smooth movement may be realized without waiting for such preparation.

The electronic information browsing apparatus explained above may be realized with a software by utilizing a desired computer. In this case, the software for realizing above functions with hardware of the computer is described and it is then recorded to a computer readable medium.

With such structure explained above, object having variable modes can be displayed in addition to two-dimensional electronic information.

The present as explained above may be formed to realize the functions of the present invention by browsing the software with a computer in order to realize the functions of the present invention stored in the memory medium.

Objects of the invention are achieved by an electronic information display method, which displays first electronic information on a display area; magnifies a part of the displayed first electronic information with a magnification factor; and displays second electronic information overlapping the first electronic information on the display area when the magnification factor exceeds a predetermined threshold factor.

Further objects of the invention are achieved by an electronic information browsing apparatus for browsing electronic information having embedded link information which describes a relationship with other electronic information, including a document layout and updating unit to determine a relationship of geographical layout to virtual space of an electronic information based on link information defined in an electronic information definition data; a visual field updating unit to define a visual field for observing the inside of the virtual space and to generate an image in virtual space including electronic information having a determined geographical layout based on the visual field definition and then to output the image to a display device; and a display image generating unit to continuously change the geographical positional relationship between the electronic information and the visual field in the virtual space according to an instruction input of a user and to continuously generate then output the image based on the visual field to the display device on a realtime basis.

Even further objects of the present invention are achieved by a computer readable memory medium on which a program for visually displaying electronic information is recorded, including code to display first electronic information on a display area; code to magnify a part of the displayed first electronic information with a magnification factor; and code to display second electronic information overlapping the first electronic information on the display area when the magnification factor exceeds a predetermined threshold factor.

Moreover, objects of the invention are achieved by a computer readable memory medium on which a program is recorded for browsing the electronic information in which the link information to describe the relationship with the other electronic information is embedded, including code for determining geographical layout to the virtual space of the electronic information based on the link information defined in the electronic information definition data; code for defining visual field to observe the virtual space to generate, based on the visual field definition, the virtual space image including electronic information having determined geographical layout and then output the image to the display device; and code for continuously changing the geographical positional relationship between the electronic information and visual field in the virtual space based on the user instruction input and then continuously generating, on the realtime basis, the image based on the visual field and outputting the image to the display device.

The above and further objects and features of the invention will more fully be apparent from the following detailed description with accompanying drawings.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIGS. 8A, 8B, and 8C are diagrams illustrating an example of a data item of document layout information.

FIGS. 13A, 13B, and 13C are flowcharts illustrating a document layout information generating and updating process sequence.

FIG. 15 is a diagram illustrating an example of display of a link destination document by a zoom-in function.

FIG. 16 is a diagram illustrating book mark generation.

DETAILED DESCRIPTION OF THE PREFERRED EMBODIMENTS

Figure 1:
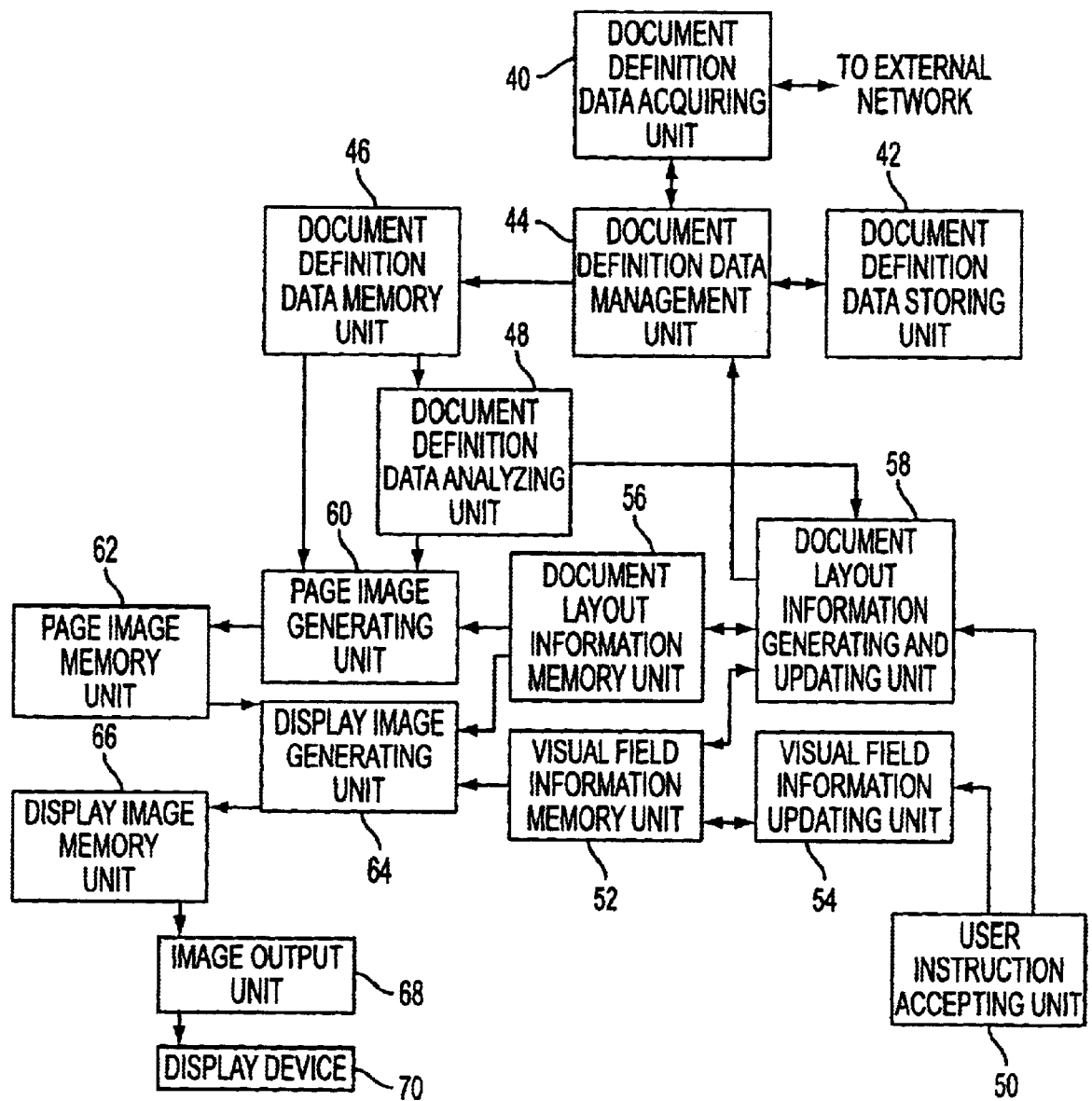
FIG. 1 is a structural diagram of an electronic document browsing apparatus according to an embodiment of the present invention.

Reference will now be made in detail to the preferred embodiments of the present invention, examples of which are illustrated in the accompanying drawings, wherein like reference numerals refer to like elements throughout.

FIG. 1 illustrates a structure of a preferred embodiment of the present invention. In the present embodiment and drawings, an electronic document described mainly by hypertext format such as HTML or the like is set forth as an electronic information. Moreover, the electronic document in the embodiment and drawings includes a program for generating a moving image and dynamic display content and electronic information defining a cubic shape. Therefore, "electronic document" or "document" in the following description corresponds to "electronic information" described in the appended claims.

The embodiment of the electronic document browsing apparatus illustrated in FIG. 1 includes document definition data acquiring unit 40, document definition data storing unit 42, document definition data management unit 44, document definition data memory unit 46, document definition data analyzing unit 48, user instruction accepting unit 50, visual field information memory unit 52, visual field information updating unit 54, document layout information memory unit 56, document layout information generating and updating unit 58, page image generating unit 60, page image memory unit 62, display image generating unit 64, display image memory unit 66, image output unit 68 and display device 70.

Figure 2A:
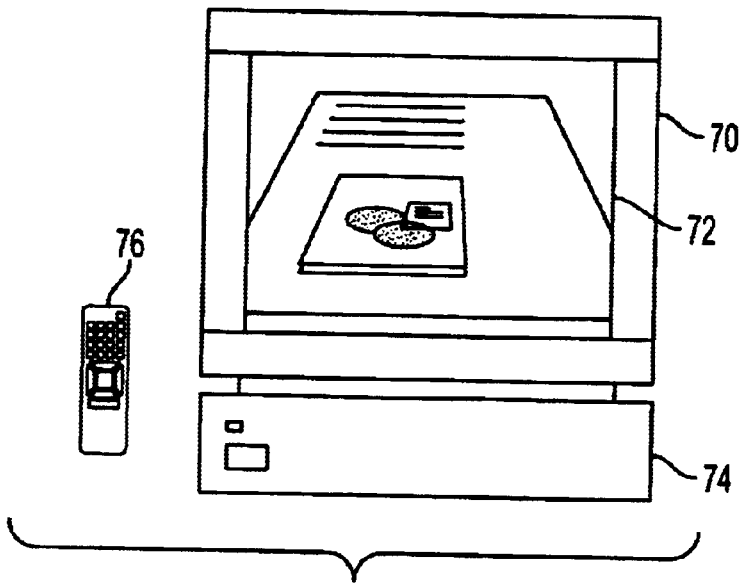
FIGS. 2A, 2B, and 2C are diagrams illustrating an external appearance of an embodiment of an electronic document browsing apparatus including remote control.
Figures 2B, 2C:
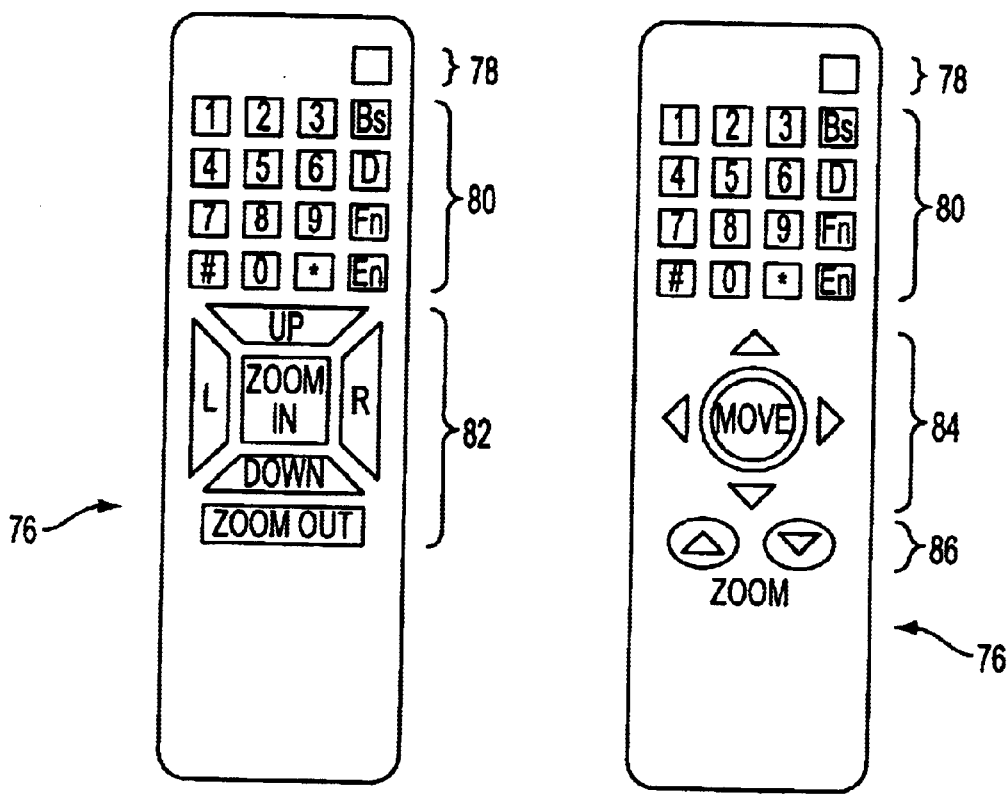
Figure 3:
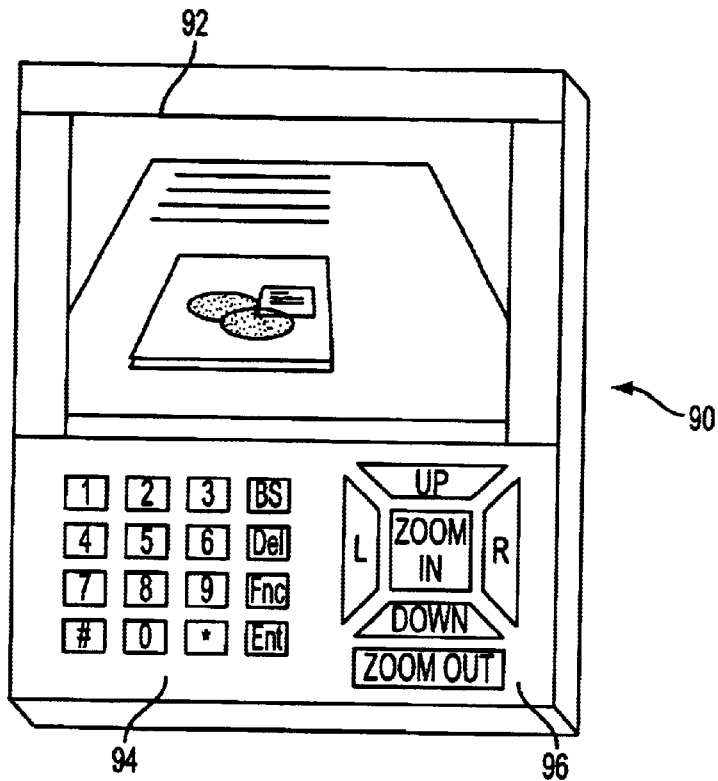
FIG. 3 is a diagram illustrating an external appearance of an embodiment of hand-held type electronic document browsing apparatus.

FIGS. 2A, 2B, and 2C, as well as FIG. 3 illustrate examples of an external appearance of an electronic document browsing apparatus according to an embodiment of the present invention.

FIG. 2A is an example of a stationary installation type electronic document browsing apparatus. More particularly, FIG. 2A illustrates a display device 70 which illustrates a display image 72 in combination with a document reading apparatus body 74 and a remote controller 76. This apparatus may be realized with software using a general purpose personal computer.

FIGS. 2B and 2C illustrate embodiments of a remote controller 76. In particular, FIG. 2B illustrates remote controller 76 having a power button 78, information input buttons 80, and visual field shifting buttons 82 likewise, FIG. 2C illustrates remote controller 76 having power button 78, information input buttons 80, visual field joystick 84, and zoom button 86.

FIG. 3 illustrates an example of a hand-held type electronic document browsing apparatus 90 having a display area 94, information input buttons 94, and visual field shifting buttons 96.

Figure 4:
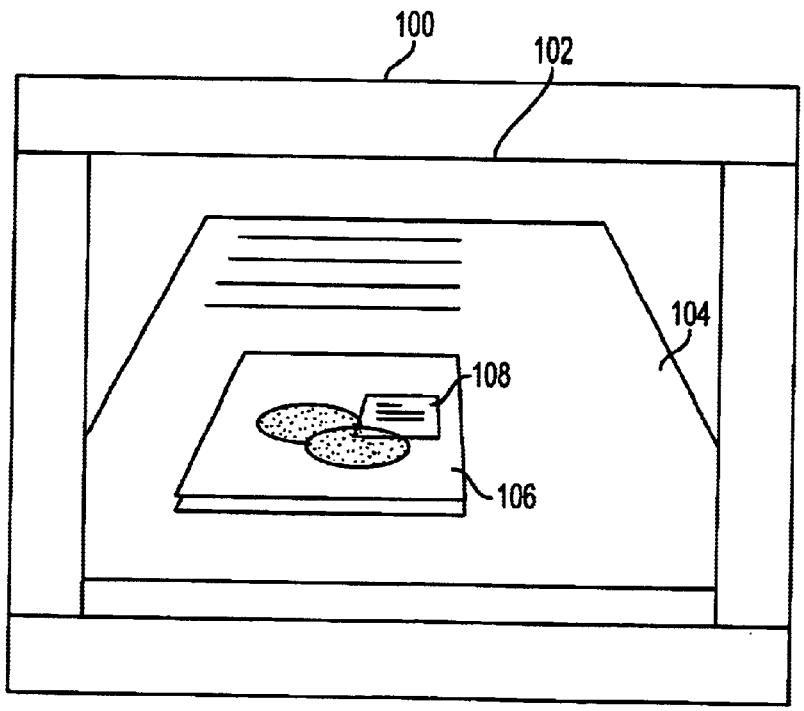
FIG. 4 is a diagram illustrating an example of a display image.

FIG. 4 is a display example in the embodiment of the present invention. Display device 100 has display area 102, wherein a first document 104 is displayed, a second document 106 is displayed on the first document 104. Moreover a third document 108 is displayed on the second document 106. In this display example, the link of hypertext structure is assumed to be defined for the documents 104, 106 and 108, the link to the second document 106 is also assumed to be defined to the document definition data of first document 104 and the link to the third document 108 is also assumed to be defined to the third document 108 in the document definition data of the second document 106. On the basis of these definition of links, the geographical layout in the virtual space of each document is determined and moreover a geographical relationship between these documents and visual field is determined. A display image is then generated on the basis of such visual field and such display image is then output to a display device 70 to obtain a display example of FIG. 4.

Figure 5:
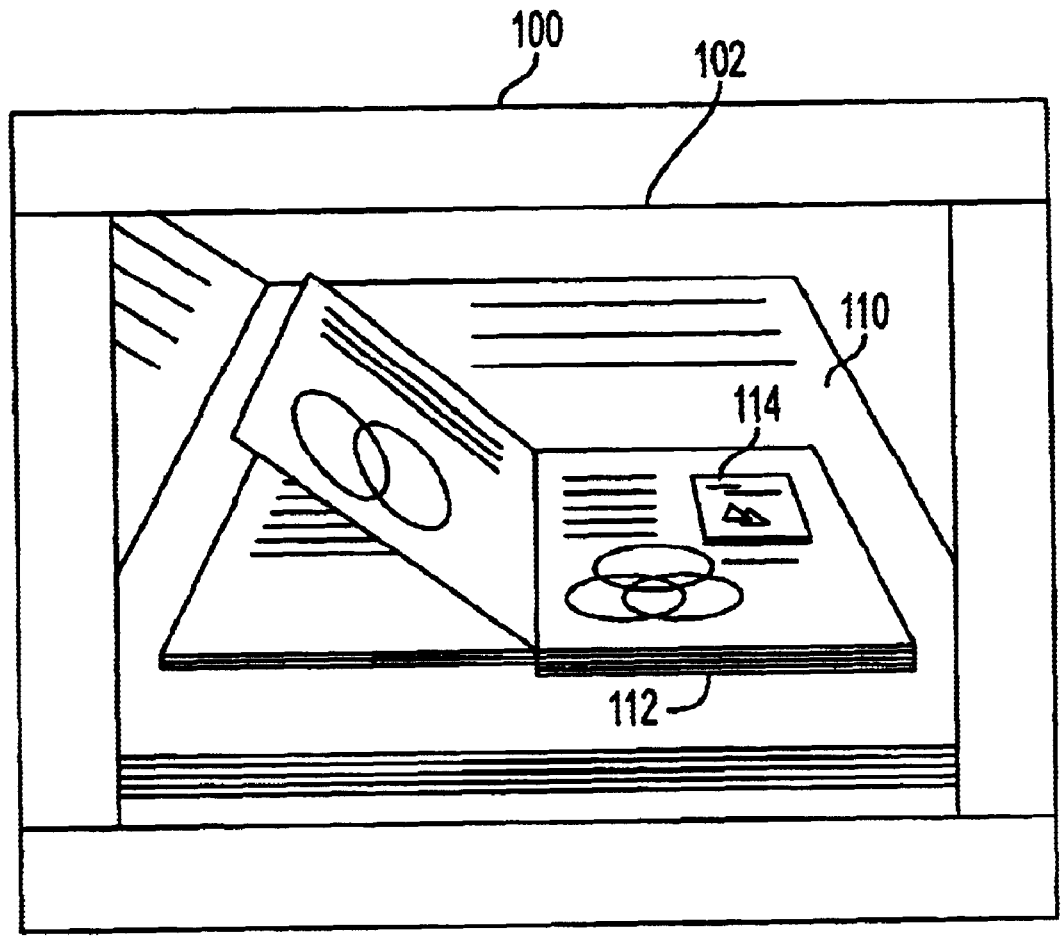
FIG. 5 is a diagram illustrating an example of a display image of an electronic document including of a plurality of pages.

In addition, the geographical relationship between documents and visual field in the virtual space is continuously changed on the basis of a user's instruction, thereby an image based on such visual field is continuously generated on the realtime basis and it is then output to the display device. Accordingly, while the visual field in the virtual space is continuously changed, a user can reach an electronic document for which the link of the hypertext structure is extended and can read such document by continuously changing the virtual appearance of the electronic document. An example of a change of display area due to the change of visual field is illustrated in FIG. 5.

In the display example of FIG. 4, the virtual space in which a document is arranged is a three-dimensional space and each document arranged in the space is perspectively converted by the high speed perspective converting unit on the realtime basis and is then displayed on the display area.

In the display example of FIG. 4, the second document 106 linked from the first document 104 is arranged and displayed on the first document 104 as the link source in the condition compressed for the first document 104. Moreover, the third document 108 linked from the second document 106 is arranged and displayed on the second document 106 as the link source in the condition compressed for the third document 108. In the display example of FIG. 4, the third document 108 is displayed considerably smaller than the display area and therefore display priority is calculated lower than that of the first document 104 and the second document 106. As a result, the third document 108 is displayed in the half-transparent condition and a part of the second document 106 can be observed through the third document 108.

FIG. 15 illustrates an example of a display of another electronic document previously related to a part of the relevant electronic document through overlapping by enlarged display of the electronic document displayed on the display area through the zoom-in function.

As illustrated, in the condition 1, the first document 104 and the second document 106 which is related to the first document 104 by overlapping on the first document 104 are displayed on the display area.

A condition of the display area may be shifted to the condition 2 through the zoom-in function by shifting the viewpoint. The first document 104 and second document 106 are respectively magnified for display. Moreover, the third document 108, which is previously related to the second document 106, is displayed overlapping on the second document 106 in the half-transparent condition.

In addition, when the viewpoint is shifted for the zoom-in function, display is shifted to the condition 3. The documents 104, 106 and 108 are then respectively magnified for display, and the third document 108 is displayed in the non-transparent condition.

Figure 6:
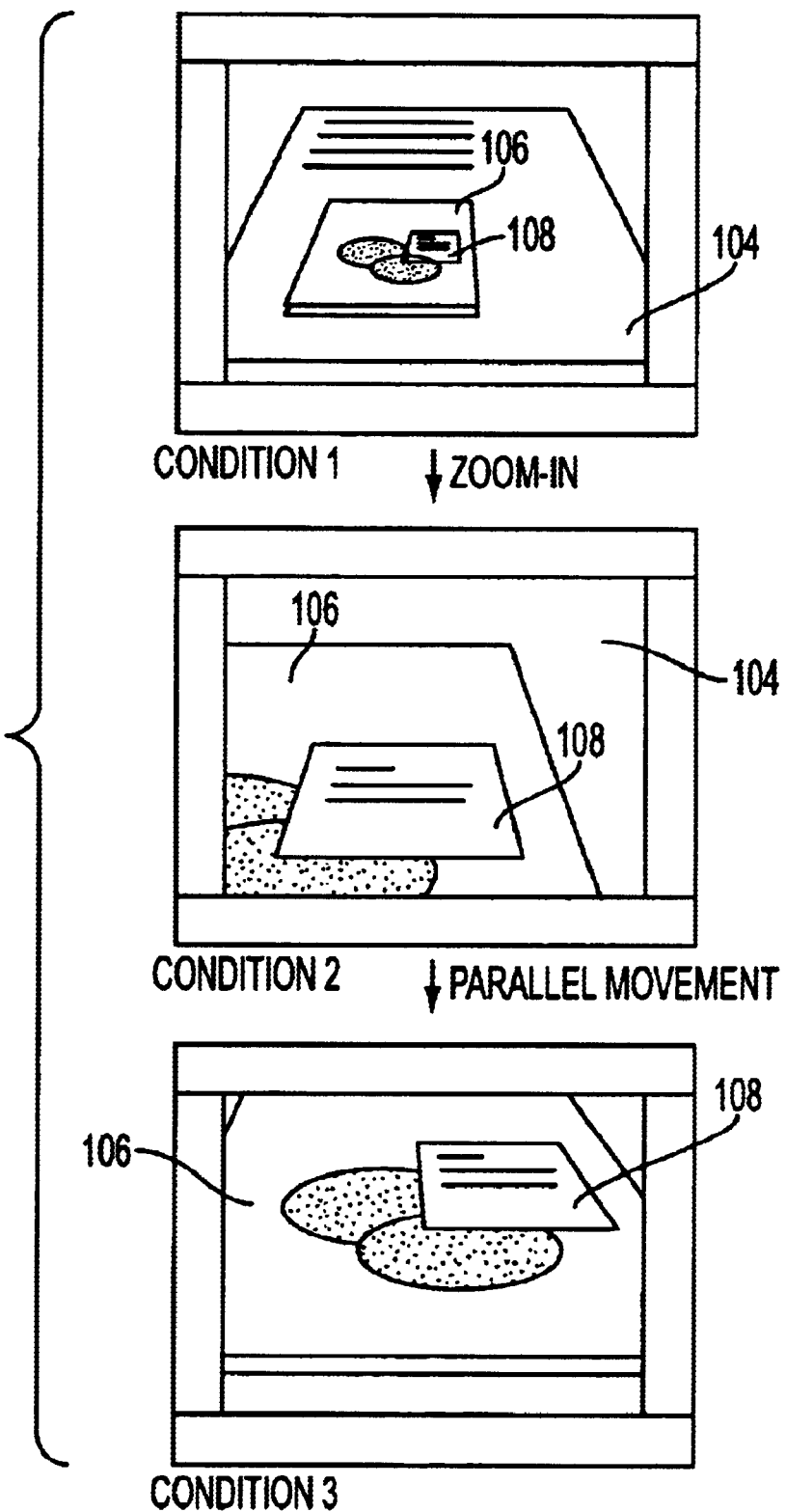
FIG. 6 is a diagram illustrating an example of a change of a display image due to a shift of a visual field.

FIG. 6 illustrates continuous change of a display image by changing the geographical relationship between the document arranged in the three-dimensional virtual space and the visual field.

In the display area of condition 1, the documents 104, 106, and 108 are displayed. When the viewpoint is relatively approximated to the noted viewpoint at the front surface, each document on the display area becomes gradually large to provide the display area of condition 2. Next, when the visual field is shifted to the left lower direction of the document in parallel to the document plane of each document, each document moves in the right upper direction on the display area to provide the display image of condition 3.

FIG. 5 illustrates an example of a display image displaying an electronic document similar to a book as the printed material including a plurality of pages. In FIG. 5, the documents 110, 112 and 114 are displayed like books including a plurality of pages. On the opened page of the fourth document 110, a fifth document 112 for which the link from such page is defined is arranged and displayed and on the opened page of the fifth document 112, a sixth document 114 for which the link from such page is defined is arranged and displayed.

The functions explained above may be realized by the structure illustrated in FIG. 1. Each structural element will be explained below.

A document definition data acquiring unit 40 is composed of a communication unit for the network or the like in the outside of the apparatus or the unit for browsing information from information memory medium and control circuit and control program or the like for these elements in order to acquire the document definition information depending on requirement from the other modules.

A document definition data storing unit 42 includes an information storing unit such as a hard disk or the like and its control program or the like in view of storing the acquired document definition data and document definition data generated in the present apparatus.

A document definition data memory unit 46 includes a memory or the like to temporarily store document definition data under the condition that reference may be made any time required on the occasion that the other modules makes reference to content of the document definition data.

A document definition data management unit 44 includes a program or the like operating on the CPU for the purpose of management of document definition data stored in the document definition data storing unit 42 and document definition data memory unit 46 and prepares the necessary document definition data on the document definition data memory unit 46 when the document layout information generating and updating unit 58, document definition information analyzing unit and page image generating unit 60 require reference to the document definition data. When the necessary document definition data exists in the document definition data storing unit 42, it is read. When these data do not exist, an instruction is issued to the document definition data acquiring unit 40 to acquire the document definition data, and then such document definition data is sent to the document definition data memory unit 46.

The document definition data analyzing unit 48 analyzes content of document definition data by making reference to the document definition data provided on the document definition data memory unit 46 to extract information regarding the structure of document which will be required for page image generation in the page image generating unit 60 and link information of document required for generation and update of the document layout information in the document layout information generating and updating unit 58.

A page image generating unit 60 generates a page image of document using the document definition data stored in the document definition data memory unit 46 and result of analysis by the document definition data analyzing unit 48. In the page image generation, page images in a plurality of resolution are generated for only one page.

A page image memory unit 62 temporarily stores page images generated by the page image generating unit 60. A user instruction accepting unit 50 includes an instruction input device such as a remote controller, input button and joy stick or the like and its control program or the like. This device accepts the user's instruction for forward and backward shift of visual field, vertical and horizontal shift, angular change and forward and backward turning of page, etc. and then transfers the accepted instruction to the visual field information updating unit 54 and document layout information generating and updating unit 58.

A document layout information generating and updating unit 58 determines the relative geographical relationship between documents arranged in the virtual space depending on the previously determined rule using the document layout information stored in the document layout information memory unit 56, visual field information stored in the visual field information memory unit 52 and document definition data analysis result by the document definition data analyzing unit 48 and then defines the determined content as the document layout information.

Content defined by the document layout information should be the information concerning the mutual geographical relationship of the documents of the link source and link destination regarding each link between documents arranged in the virtual space and documents arranged in the virtual space required for generation of a display image.

A document layout information memory unit 56 stores the document layout information explained above.

A visual field information updating unit 54 continuously updates the visual field defining the geographical relationship between the document and visual field in the virtual space depending on user's instruction received from the user instruction accepting unit 50.

In the visual field information, the geographical relationship of the visual field for any one document among those in the virtual space is defined. Documents in the virtual space are all coupled by a link and the geographical relationship is defined for each link. Therefore, as a result, geographical relationship of visual field can be established for all documents through definition of the visual field information.

A visual field information memory unit 52 stores the visual field information explained above.

A display image generating unit 64 generates a display image by utilizing document layout information stored in the document layout information memory unit 56, visual field information stored in the visual field information memory unit 52 and page image stored in the page image memory unit 62.

When the visual field is changed continuously, the display image generating unit 64 generates, on a realtime basis, the continuously changing display image based on the visual field information.

The generated display image is once stored in the display image memory unit 66 and is then output to the display device through the image output unit.

Explained above is the basic operation of each structural element of the embodiment illustrated in FIG. 1.

A more practical embodiment will then be explained below.

The virtual space in which documents are arranged may be the two-dimensional space but the three-dimensional virtual space is assumed in the embodiment explained hereunder.

In view of continuously changing the visual field and generating a display image which changes smoothly in regard to the documents arranged in the three-dimensional virtual space, the display image generating unit 64 is provided with the function to transparently convert a page on which the page image is mapped at a high speed on the realtime basis and to draw the display image.

Figure 7:
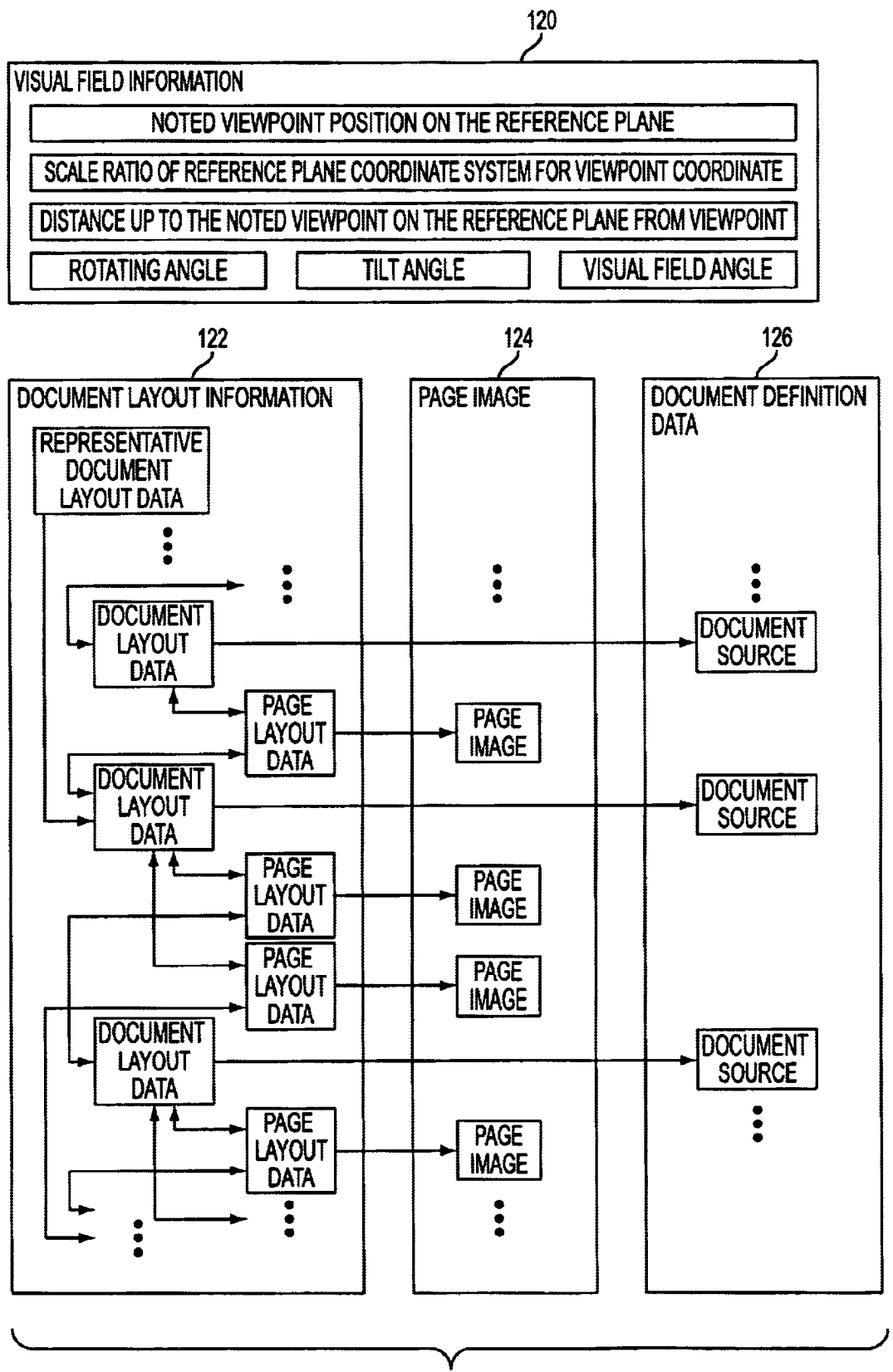
FIG. 7 is a diagram illustrating an example of a data format.

FIG. 7 illustrates a data format realizing an example of visual field information 120, document layout information 122, page image 124 and document definition data 126.

FIGS. 8A, 8B, and 8C illustrates an example of data items of document layout information.

Figure 9A:
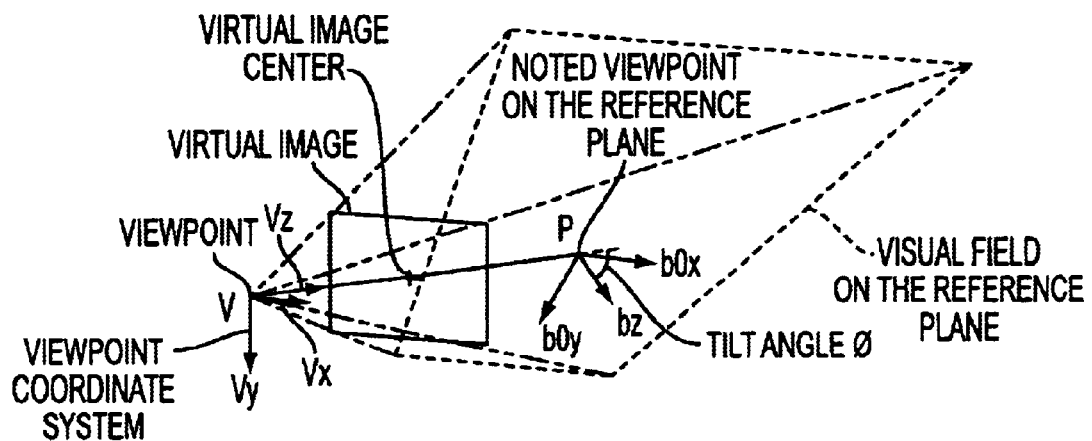
FIGS. 9A and 9B is a diagram for explaining definition of a geographical relationship of a visual field and a document.
Figure 9B:
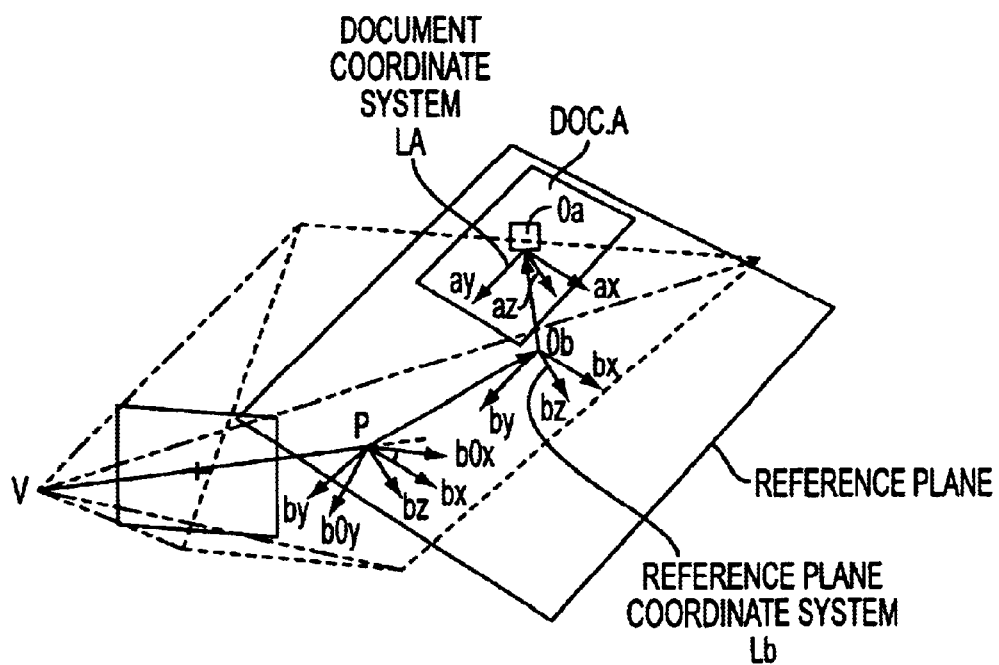

FIGS. 9A and 9B is a diagram for explaining definition of geographical relationship between visual field and document. In the three-dimensional virtual space, absolute coordinate of the virtual space is never used for definition of the visual field and the position of the document but a mutual geographical relationship is completely defined.

In general, the link having endless hierarchy in the link destination direction may be defined in the documents having the hyper link structure. Therefore, when document position is defined with the absolute coordinate of the single virtual space, scale becomes very small for the document in the link route at the link following destination area and thereby expression by numerical data becomes difficult and an error may be increased. In order to avoid such process, only the relative geographical relationship of the documents in the link source and link destination of each link is defined for the document layout information.

In regard to definition of visual field, the visual field is defined by the relative geographical relationship for one document among those having defined relative geographical relationship without using the absolute coordinate of the virtual space.

For a definition of the visual field, the viewpoint coordinate system as the linear coordinate system is defined. The unit direction vectors in the X, Y, Z axis direction of the viewpoint coordinate system are assumed as vx, vy, vz. The origin of the viewpoint coordinate system is defined as the viewpoint for generating a display image. The noted viewpoint direction, namely center direction of display area is assumed as the Z axis positive direction of the viewpoint coordinate system.

In the viewpoint coordinate system, a rectangular virtual display image which is parallel to the XY plane and of which center is located on the Z axis is assumed. This virtual display image is assumed to be located at the position of which Z axis value is positive. Moreover, the right direction of virtual display image is matched with the positive direction of X axis of the viewpoint coordinate system, while the lower direction of the virtual display image is matched with the positive direction of Y axis of the viewpoint coordinate system. The area observed within the rectangular frame of this virtual display image when the virtual space is observed from the viewpoint is defined as the visual field. Namely, in regard to the origin of the viewpoint coordinate system, a document obtained when the document in the virtual space is projected on the virtual display image is defined as the display image.

The visual field angle may be changed by changing a size of rectangular shape by fixing the Z coordinate value of the position in the virtual display image. In this embodiment, the visual field angle is defined as one of the parameters of visual field information. The visual field angle is defined, for example, as the angle of visual field in the horizontal direction of the display area and the display image is generated by assuming the virtual display area of which visual field is matched with the visual field explained above.

In order to define the geographical relationship between the visual field and document, the reference plane is considered. While the geographical relationship between the reference plane and document is fixed, the geographical relationship between document and visual field is changed to change the geographical relationship between the document and visual field.

As the reference plane, the reference plane coordinate system, in which the XY plane is matched with the reference plane and the Z axis becomes perpendicular to the reference plane, is defined. Relationship between document and visual field can be defined by defining the geographical relationship between the reference plane coordinate system and viewpoint coordinate system.

As illustrated in FIG. 7, in this embodiment, as the parameters for defining a relationship between the viewpoint coordinate system and reference plane coordinate system, noted viewpoint position on the reference plane, scale ratio of the reference plane coordinate system for the viewpoint coordinate system, distance up to the noted gaze point on the reference plane from the viewpoint, rotating angle and tilt angle are used. Moreover, the visual field information is defined considering the visual field angle.

Respective parameters will be explained with reference to FIGS. 9A and 9B. In FIGS. 9A and 9B, the origin is defined as 0b and vectors bx, by, bz are defined in the X, Y, Z axis direction in the reference plane coordinate system. The gaze point position on the reference plane is defined as P and the position of P is defined in the reference plane coordinate system as the parameter of visual field information. The scale ratio of the reference plane coordinate system for the viewpoint coordinate system is identical to a ratio between the unit length of the viewpoint coordinate system and reference plane coordinate system. Distance up to the gaze point on the reference plane from the viewpoint is defined as the distance between P and V in the viewpoint coordinate system. The rotating angle is formed by the X axis of the viewpoint coordinate system and X axis of the reference plane coordinate system. The tilt angle is formed by the Z axis of the viewpoint coordinate system and the Z axis of the reference plane coordinate system.

In the document layout information, the document coordinate system and page coordinate system are respectively defined for each document and each page belonging to such document in order to define the geographical relationship of documents in the virtual space.

A relationship of these coordinate systems is defined by the document layout information of data format illustrated in FIG. 7 and the geographical relationship between the document and page in the virtual space is defined. In the document layout information, format data such as representative document layout data, document layout data and page layout data is defined. Example of data items of each format data is illustrated in FIGS. 8A, 8B, and 8C.

In order to define the relationship between the reference plane coordinate system and document coordinate system, the document layout information generating and updating unit 58 determines, depending on the predetermined rule, the representative document from the documents arranged in the virtual space. Moreover, the geographical relationship between the document coordinate system and reference plane coordinate system of the representative document is determined to generate the representative document layout data illustrated in FIG. 7 and FIGS. 8A, 8B, and 8C. In the representative document layout data, coordinate conversion matrix to the reference plane coordinate system from the representative document coordinate system is defined. Moreover, the document layout information generating and updating unit 58 determines the geographical relationship between the linked document and page in the virtual space to generate the document layout data and page layout data illustrated in FIG. 7 and FIGS. 8A, 8B, and 8C. In the document layout data, conversion matrix from the document coordinate system to the page coordinate system of the link source page to this document is defined. In the page layout data, conversion matrix from the page coordinate system to the document coordinate system of document to which the page belongs is defined.

Moreover, in regard to the documents having the hypertext format, each pointer illustrated in FIGS. 8A, 8B, and 8C defines the data format of the document layout information as illustrated in FIG. 7 and thereby the layout of document to the display area is determined in combination with the visual field information.

Figure 10:
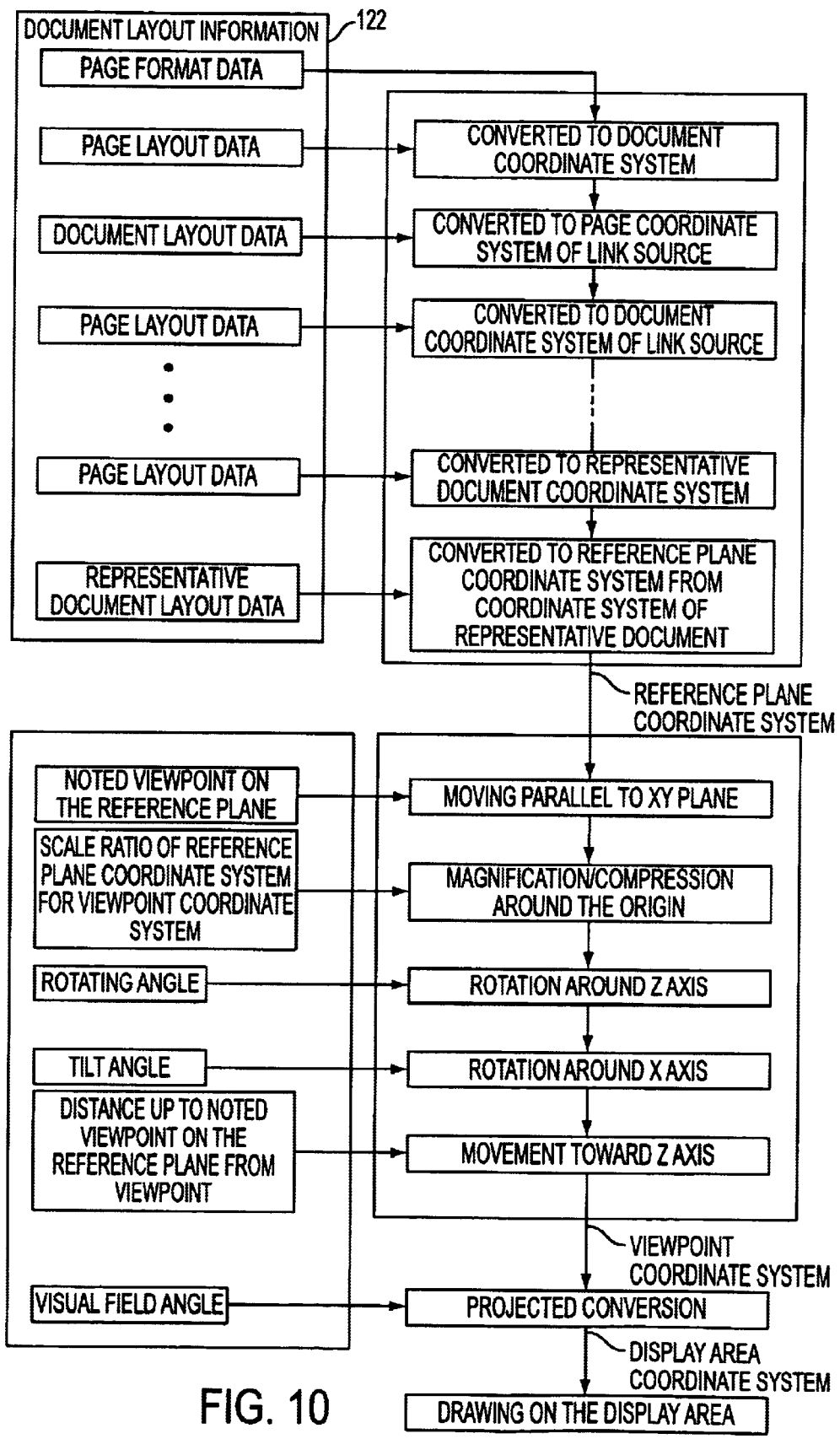
FIG. 10 is a diagram illustrating a page coordinate conversion sequence.

FIG. 10 illustrates flow of coordinate conversion up to pages are drawn on the display area. In the page format data, layout of page image in the page coordinate system is defined. This page format data is converted to the document coordinate system by the coordinate conversion matrix defined in the page layout data and moreover, it is then converted to the page coordinate system of the link source by the coordinate conversion matrix defined in the document layout data. This process is repeated. Finally, such page format data is converted to the reference plane coordinate system by the coordinate conversion matrix defined in the representative document layout data, only for the pages of document linked in the lower level than the representative document. In other cases, the coordinate conversion sequence is a little different.

The page converted to the reference plane coordinate system is further converted to the viewpoint coordinate system by each parameter defined in the visual field information and is then converted to the display area coordinate system by the projection conversion and is then displayed on the display area.

Next, the actual processing sequence in the embodiment will be explained. In the initial condition, it is assumed that the document layout data and page layout data of at least one document are defined in the document layout information, one document is defined as the representative document and the representative document layout data is defined. Moreover, it is also assumed that adequate value is defined as the visual field information.

Figure 11:
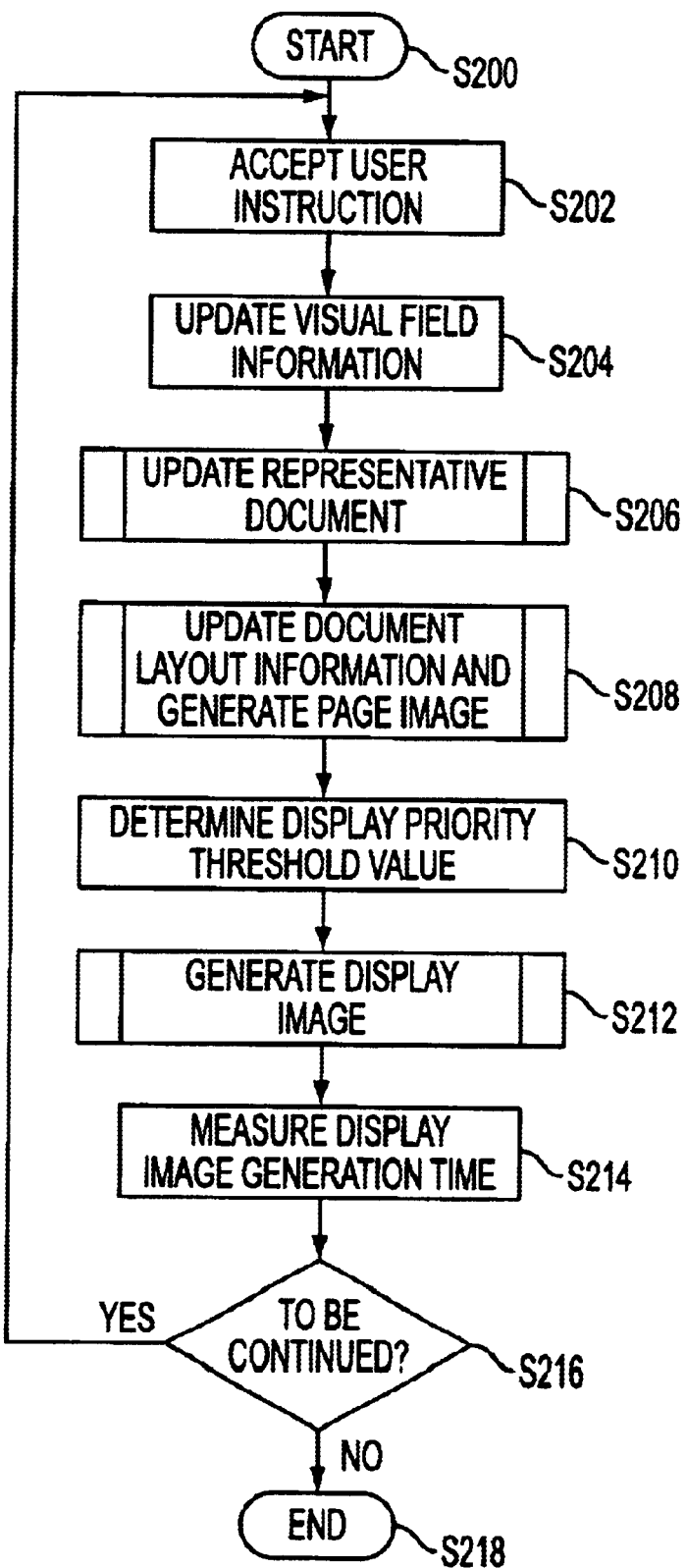
FIG. 11 is a flowchart illustrating a continuous image generation process sequence.

FIG. 11 illustrates a processing sequence for continuous generation of images. In a series of processes, beginning with step 200, and ending with step 218, a user instruction is first accepted by the user instruction accepting unit 50 in step 202. Based on this acceptance, in step 204 the visual field information updating unit 54 updates the visual field information. Subsequently in step 206, representative document update, document layout information update and page image generation (step 208) are conducted. Moreover, the display priority threshold value is determined in step 210 to generate the display image. For generation of the display image in step 212, a display image generating time is measured in step 214. For continuous image generation, the above process is repeated by way of step 216. If continuous generation of image is unnecessary, this process may be intercepted in direct.

The user instruction accepting unit 50 is capable of accepting visual field shifting instruction from the visual field shifting button or joy stick, for example, as illustrated in FIG. 2 or FIG. 3. As the visual field shifting instruction, instruction for vertical or horizontal shift, zoom-in and zoo-mout functions is accepted.

When the vertical and horizontal shift instruction is accepted, the visual field information updating unit 54 changes continuously the noted gaze point on the reference plane among the visual field information. Virtual shifting rate of the noted viewpoint may always be kept constant by setting such shift geographically in proportional to the distance up to the noted gaze point on the reference plane from the viewpoint.

When the zoom-in or zoom-out instruction is accepted, the visual field information updating unit 54 continuously changes the scale ratio of the reference plane coordinate system for the viewpoint coordinate system among the visual field information. Here, the distance up to the noted gaze point on the reference plane from the viewpoint may be changed in place of changing the scale ratio of the reference plane coordinate system for the viewpoint coordinate system. These values keep constant virtual zooming rate for the reference plane by keeping constant the changing rate.

Moreover, the visual field information can be updated by accepting respectively the rotating angle, tilt angle and visual field angle.

For determination of display priority threshold value, the threshold value for determining whether document is displayed or not, threshold value for determining whether page is displayed or not, threshold value for determining whether page is displayed in the half-transparent condition or not and threshold value for determining necessity of page image generation are determined for display priority of document and page.

In determination of threshold value to determine whether document and page are displayed or not in order to realize the display of smooth movement when an image to be displayed is moved, when the measured result is longer than the target time to obtain smooth movement, the threshold value is increased higher than the current value based on the preceding result of measurement for a display image generation time and such threshold value is decreased when the result is shorter than the target time.

For the display of smooth movement, the display image generation of about 30 times per second is required. Therefore, representative document update, document layout information update and page image generation are executed by the loop independent from the display image generation in parallel to the display image generation and thereby the loop for display image generation may be executed with priority.

Figure 12:
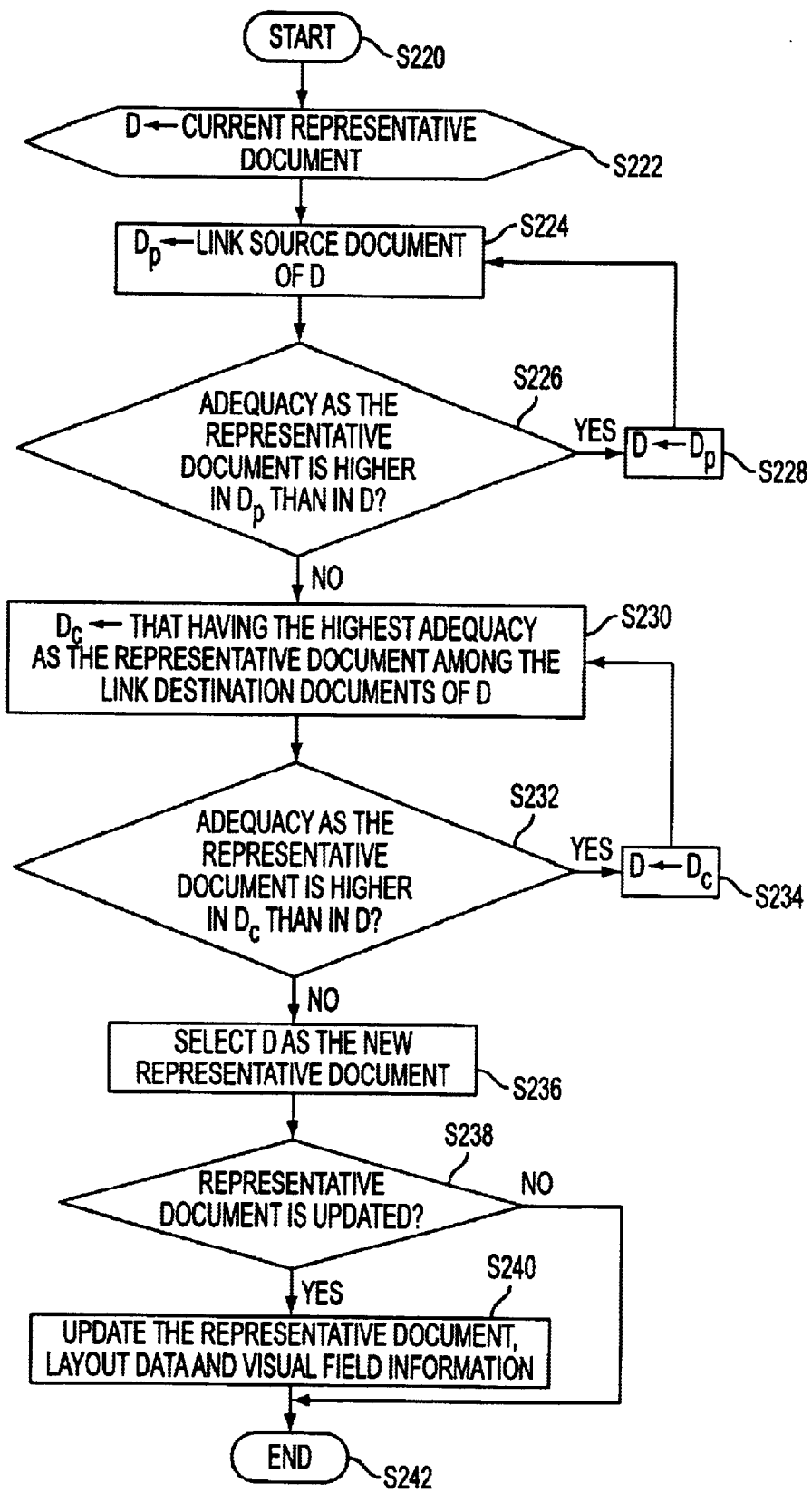
FIG. 12 is a flowchart illustrating a representative document updating process sequence.

FIG. 12 illustrates the process sequence for representative document update beginning with step 220 and ending with step 242. The representative document is determined in step 222, through the search in step 224 for the link of the document in the process such as document layout information update and display image generation. Under the object that follows the document link should be done as much as effectively from the starting point of the representative document. For this purpose, a unit for determining adequacy of the representative document is provided to operate in step 226.

In the representative document update process, the current representative document is defined first as D. Subsequently, link source document to the document D is defined as Dp in step 228. Here, adequacy of the respective representative documents is sequentially determined through step 226. When adequacy as the representative document of Dp is higher than that of the document D, Dp is defined as the new representative document D and the processes after the setting of Dp are repeated.

When D has the higher adequacy than Dp, the document having highest adequacy as the representative document among the link destination documents from D is then defined as Dc in step 230 and adequacy of Dc is compared with that of D. When adequacy of Dc is higher than that of D, Dc is defined as a new representative document D and above processes are repeated through a combination of steps 232 and 234.

When adequacy as the representative document of D is higher than that of Dc, the document D is defined as the new representative document in step 236. When the representative document is changed by the processes explained above, the representative document layout data and visual field information are updated in step 238. In the representative document layout data update, a conversion matrix to the reference plane coordinate system from the representative document coordinate system is determined in step 240 so that the plane when page of the representative document is opened is matched as much as possible with the reference plane. Simultaneously, the visual field information is also changed to keep the geographical relationship between the visual field and each document. The process ends in step 242.

It is also possible that the document coordinate system is defined previously to be able to define the conversion matrix as the unit matrix in order to save the procedures for determination of conversion matrix.

Moreover, normalization is also performed to keep the numerical values of the representative document layout data and visual field information within the adequate range. In more practical, similar magnification and compression are conducted centering around the origin of the viewpoint coordinate system in such a manner that the distance up to the noted gaze point on the reference plane from the viewpoint becomes equal to the predetermined value and virtual appearance of display image does not change. This process may be realized by changing the scale ratio of the reference plane coordinate system for the viewpoint coordinate system and the distance up to the noted gaze point on the reference plane from the viewpoint in the same rate.

FIGS. 13A, 13B, and 13C illustrate the processing sequence of the document layout information update. Moreover, the search condition for determining whether the search is continued or not for searching the link in the upper or lower direction is redetermined.

Turning to FIG. 13A, the process begins with step 244 and ends with step 254. In the processing sequence for document layout information update and page image generation illustrated in FIGS. 13A the representative document is defined first as D and while D satisfies the upper direction search condition, the link source document of D is defined as a new representative document D repeatedly through steps 246, 248 and 250. When the upper direction search condition is no longer satisfied, a sub-routine DocRenew(D) is called in step 254.

In FIG. 13B, the subroutine DocRenew(D) is illustrated through steps 256 to 270. A display priority of the document D is calculated first in step 258. When document definition data of D is not yet obtained, the document definition data of D is acquired in step 260. Then, it is arranged on the document definition data memory unit 46 in step 262, the page layout data of page belonging to D is generated on the basis of the analysis result of document definition data in step 260 and then document layout data of the link destination document from each page is generated in step 264. The document layout data of D is updated by reflecting such result in step 266.

Subsequently, the subroutine PageRenew(P) is called in step 268 using each page satisfying the lower direction search condition among the pages belonging to D as an argument P.

FIG. 13C illustrates the subroutine PageRenew(P) through steps 272 to 282. First, a display priority of page P is calculated in step 274. Subsequently in step 276, when display priority of page P is determined as reaching a necessity of the page image generation in step 276, if page image is not yet generated, a page image is generated in step 278 and it is then arranged on the page image memory unit 62 in step 280.

After updating the page layout data of P in step 280 by reflecting the result, the subroutine DocRenew(D) is called in step 282 using each document satisfying the lower direction search condition among those linked from P as an argument D. In the above process, the upper or lower direction search condition is set to search all documents and pages in relation of display and not to search the documents and pages having less relation with the display. In calculation for display priority of page and document, such display priority value is determined in such a manner as it becomes higher when position and size on the display area are much more suitable for browsing.

Figure 14A:
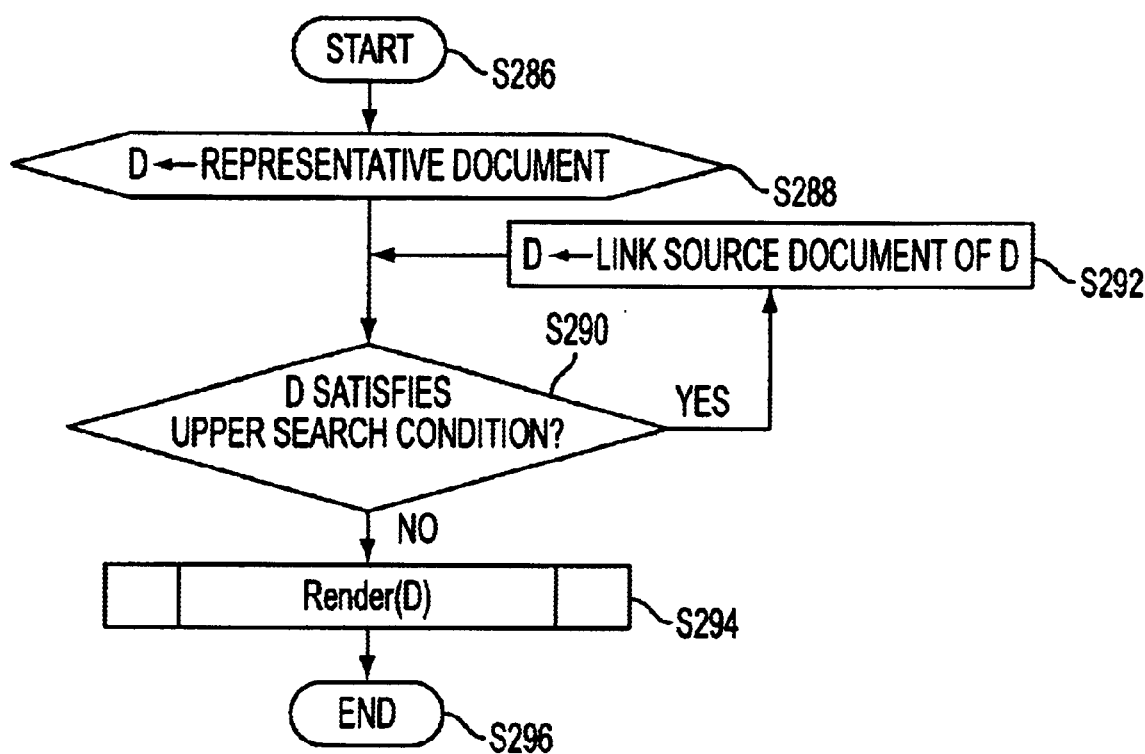
FIGS. 14A and 14B are flowcharts illustrating a display image generation process sequence.
Figure 14B:
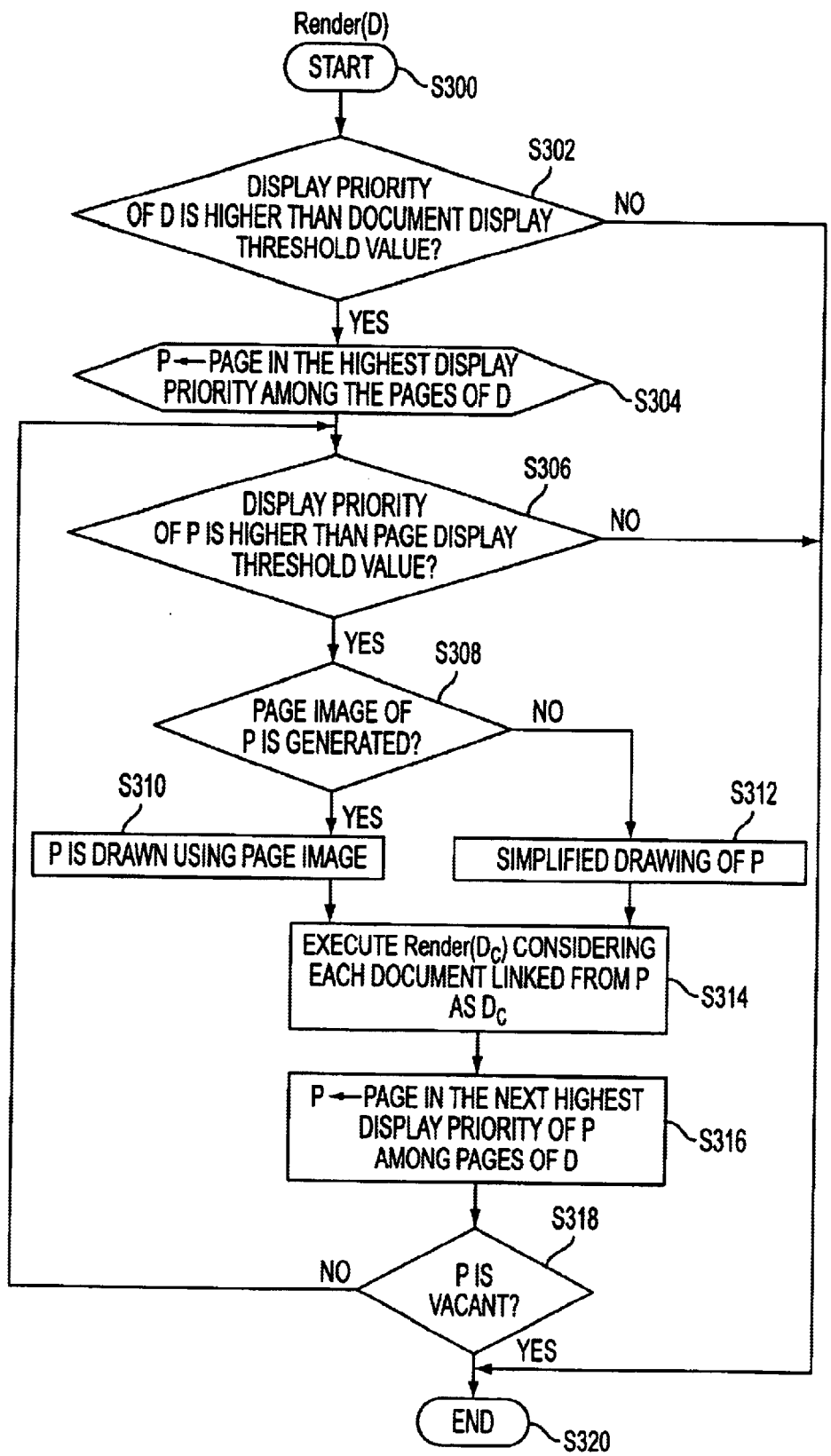

FIGS. 14A and 14B illustrates the display image generating process sequence. FIG. 14A illustrates steps 286 to 296. In generation of a display image, the representative document is defined as D first in step 288, then the process to define the document of link source to D as a new D is repeated in steps 290 and 292 while D satisfies the upper direction search condition. When such upper direction search condition is no longer satisfied, the subroutine Render(D) is called in step 294 using the document D as an argument.

FIG. 14B illustrates the subroutine Render(D) through steps 300 to 320. Beginning in step 302, when display priority of document D does not exceed the threshold value of document display, the process may be completed in direct and flow proceeds to step 320. In other cases, the page having the highest display priority among those belonging to the document D is defined as P in step 304.

Turning to step 306, when the display priority of page P does not exceed the page display threshold value, the process may be completed in direct to step 320. In other cases, when page image of P is already generated, the page P is drawn on the display area using the page image in step 308. When generation of page image is not yet completed, page P is displayed briefly on the display area in step 310 or if the page image is not yet generated, a simplified image is drawn in step 312. Moreover, after the subroutine Render (Dc) is executed in step 314 using the document linked from the page P as the argument Dc, the page having the next highest display priority to P among the pages belonging to the document D is newly defined as P in step 316. When P is not vacant, the processes after determination of page display threshold value are repeated using step 318.

In the drawing of page to the display area using a page image, drawing is performed in the most suitable resolution using the page images having a plurality resolution of the relevant page stored in the page image memory unit 62 depending on virtual size of page on the display area.

Moreover, in the page drawing, a half-transparent display is conducted for the pages having lower threshold value to determine whether display priority is half-transparent display or not. In this case, the lower the display priority, the higher the transparency of image.

Moreover, in the above embodiment, a user is capable of generating a bookmark data and a new document definition data through re-arrangement of link to the existing document by providing the document definition data generating and editing unit in addition to the structure of FIG. 1. This document definition data generating and editing unit updates the document definition data stored in the document definition data storing unit 42 or newly generate such data via the document definition data management unit 44 based on the instruction for generation or edition of document definition data from user accepted by the user instruction accepting unit 50.

For example, it is assumed that the document definition data of the first document 304 and second document 306 are stored in the document definition data storing unit 42, condition 1 of FIG. 16 is displayed on the display area and the representative document is defined as the first document 304 in the document layout information. In this case, when the user instruction accepting unit 50 accepts the instruction to record the current representative document, the user instruction accepting unit 50 notifies such instruction to the document definition data generating and editing unit and the document definition data generating and editing unit records the information regarding the first document 304 as the representative document.

Subsequently, it is also assumed that the viewpoint moves by user instruction, condition 2 is displayed and the second document 306 becomes the representative document. When the user instruction accepting unit 50 has accepted the user instruction to generate the bookmark under this condition, the user instruction accepting unit 50 notifies this instruction to the document definition data generating and editing unit and the document definition data generating and editing unit updates the document definition data of second document 306 to add the link to the first document 304 to the predetermined position and stores the update result to the document definition data storing unit 42 in regard to the document 2 as the current representative document. Simultaneously, the document definition data update result of second document 306 is sent to the document definition data memory unit 46 and the document layout information generating unit generates the document layout information for arrange the compressed first document 304 on the second document 306 based on the analysis result of the document definition data analyzing unit 48 and then the display image becomes the condition 3 of FIG. 16 as a result of analysis. By the above process, link to the first document 304, namely bookmark is displayed on the second document 306.

Moreover, if the user instruction accepting unit 50 has accepted the user instruction to generate a copy when the condition 2 is displayed as the display image, the user instruction accepting unit 50 notifies such instruction to the document definition data generating and editing unit and the document definition data generating and editing unit generates a copy of the document definition data of first document 304 and then stores this copy in the document definition data storing unit 42 to generate the link from the second document 306 to the copy of the stored document 1 in the same manner as generation of bookmark. As a result, condition 3 of FIG. 16 is displayed in the display area.

From above processes, document definition data of copy of first document 304 is generated and is then stored. Simultaneously, link from the second document 306 to the copied first document 304 is defined.

According to the embodiment explained above, a user can generate the bookmark data and also generate the document definition data.

The electronic document having the hyper link format as the object of the display in the present invention may include a map and information relation to this map.

When an electronic document is a map, a link to more detail map from a certain map is defined in the document definition data for defining the map. In this link information, position and scale of map of the link destination for the link source map are defined. The detail map of link destination is displayed overlapping on the link source map through zoom-in from the link source map. This link may be defined in many steps for more detail maps. Thereby, the maps may be zoomed in continuously for browsing purpose to the detail map from the outline map.

Moreover, link to the electronic document other than map from a map may be defined. In this case, zoom-in is made to the place where the link is defined on the map, the linked electronic document is displayed therefrom.

Moreover, an electronic document having the hyper link format as the object of display in the present invention may be a directory (including folder) of a computer. In this case, one directory of computer is considered as one electronic document.

When the directory itself is displayed on the display area as one electronic document, an image indicating that such electronic document is the directory or an image previously designating the relevant directory is displayed as the page image of such directory. In the latter case, for example, an image linked by the particular file name from the relevant directory is displayed as the page image of such directory.

The other directory or file linked from the directory is displayed in the compressed condition on the link source directory.

Under the embodiment explained above, dynamic page display may be realized by analyzing the document definition data to generate a moving image or dynamically generate page content in the document definition data analyzing unit 48 and page image generating unit 60 and then giving the function to generate page image in the specified timing.

When the electronic document defined in the document definition data is a moving image, the document definition data analyzing unit 48 analyzes this document definition data and transfers analysis result to the page image generating unit 60. Thereby, the page image generating unit 60 sequentially generates, based on such analysis result, images of frames forming a moving image and updates in the specified timing the relevant page image stored in the page image memory unit 62. When the data required for generation of page image does not exist in the document definition data memory unit 46, the page image generating unit 60 receives the necessary data via the document definition data acquiring unit 40 or document definition data storing unit 42 to generate the page image. The display image generating unit 64 generates display image on the realtime basis using the latest page image stored in the page image memory unit 62. With the processes explained above, a moving image defined in the document definition data can be displayed on the display area.

When the electronic document defined in the document definition data generates content of display dynamically with a program, the document definition data analyzing unit 48 analyzes such document definition data and transfers analysis result to the page image generating unit 60. Based on this analysis result, the page image generating unit 60 updates, in the specified timing, the relevant page image stored in the page image memory unit 62. Thereby, like the moving image explained above, content of dynamic electronic document is displayed on the display area.

Moreover, in order to display a three-dimensional cubic object defined by the document definition data, the document definition data analyzing unit 48 should be provided with the function to generate the data for displaying a cubic object defined by the document definition data and transfer such data to the display image generating unit 64.

When the electronic document defines a cubic object, the document coordinate system is also defined like the other electronic document and the geographical relationship of document coordinate system of such cubic object for the document coordinate system of link source document or page coordinate system is generated in the document layout information generating and updating unit 58 and this is stored in the document layout information memory unit 56. The data for displaying a cubic object explained above is assumed to define the geographic shape forming a cubic object with reference to the document coordinate system of such cubic object. The display image generating unit 64 receives the data for displaying a cubic object and generates display image including cubic object on the basis of the positional relationship between the visual field information and cubic object. According to above structure, a cubic object defined by the document definition data is displayed on the display area.

When a part or entire part of the cubic object defined by the document definition data includes the moving image, like the display of the moving image explained above, the page image generating unit 60 generates a page image based on the definition of document definition data, updates, in the specified timing, the page image stored in the page image memory unit 62. The display image generating unit 64 attaches a page image to a part or entire part of the cubic object based on definition of document definition data to generate a display image. By the process explained above, a cubic object to which the moving image is attached to a part or entire part may be displayed.

As explained above, according to the present invention, electronic documents having the hypertext format may be arranged in one continuous space. Therefore, a user can read the documents by following the link of the hypertext and can realize continuous magnified display of all documents linked by the link while continuously changing the visual field in the virtual space. Accordingly, all electronic documents linked by the link may be read through continuous change of display area and more comfortable electronic document browsing environment than that of related art may be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalent of such metes and bounds thereof are therefore intended to be embraced by the claims.

What is claimed is:

1. An electronic information browsing apparatus for browsing electronic information having embedded link information which describes a relationship with other electronic information, comprising:

a document layout and updating unit to determine a geometrical layout to virtual space of a group of items of electronic information, by determining geometrical relationships between a source item of electronic information and destination items of electronic information to which the source item of electronic information is linked, based on link information defined in an electronic information definition data;

a visual field updating unit to define and update a visual field for observing the inside of said virtual space and to generate an image in virtual space including electronic information having a determined geometrical layout based on the visual field definition, and then to output the image to a display device, wherein one of a plurality of linked items of electronic information is defined as a representative item of electronic information, and the visual field updating unit defines and updates a geometrical relationship between the visual field and the representative item of electronic information, with the geometrical relationships between the visual field and all items of electronic information in the virtual space being determined and updated based on the geometrical relationship between the visual field and the representative item of electronic information and on the geometrical relationships between the source item of electronic information and the destination items of electronic information as determined by the document layout and updating unit; and a display image generating unit to continuously change the geometrical positional relationship between the electronic information and the visual field in said virtual space according to an instruction input of a user and to continuously generate then output the image based on the visual field to the display device on a realtime basis.

2. The electronic information browsing apparatus according to claim 1, comprising:

an electronic information definition data acquiring unit to acquire the electronic information definition data from a network;

an electronic information definition data storing unit to store the electronic information definition data acquired from said electronic information definition data acquiring unit or electronic information definition data generated by the browsing apparatus;

an electronic information definition data memory unit to temporarily store the electronic information definition data for referring thereto from an electronic information definition data analyzing unit and page image generating unit;

an electronic information definition data management unit to administrate the electronic information definition data to be stored in said electronic information definition data storing unit, to acquire the electronic information definition data via said electronic information definition data acquiring unit, and then to administrate and distribute requested electronic information definition data requested by another module;

an electronic information definition data analyzing unit to analyze the electronic information definition data and acquire the information to be used for generation of a page image and electronic information layout information;

a page image generating unit to generate each page image of electronic information using the electronic information definition data and a corresponding analysis result;

a page image memory unit to temporarily store the page image generated by said page image generating unit;

a user instruction accepting unit to accept an instruction from a user and then transfer the instruction to another module;

an electronic information layout information memory unit to store electronic information layout information to define the information concerning layout in virtual space of electronic information linked by a hypertext format or other link definition formats;

an electronic information layout information generating and updating unit to generate electronic information layout information based on the result of analysis of the electronic information definition data and then update electronic information layout information depending on a change of visual field information;

a visual field information memory unit to store visual field information to define the area as the object of display image generation in virtual space;

a visual field information updating unit to update visual field information based on user instruction accepted by said user instruction accepting unit;

a display image memory unit to temporarily store the display image generated by said display image generating unit; and an image outputting unit to continuously output display the image stored in said display image memory unit, wherein said display image generating unit continuously generates the display image using a page image based on the electronic information layout information and the visual field information.

3. The electronic information browsing apparatus according to claim 2, wherein said visual field information updating unit changes three-dimensionally and continuously the geometrical relationship between the visual field and electronic information based on user instruction;

said display image generating unit further draws the page on which a page image is attached to the display image at a high speed through perspective transformation; and said display image generating unit generates the continuously changing display image based on the relationship between the continuously changing visual field and electronic information in real time.

4. The electronic information browsing apparatus according to claim 2, wherein said electronic information layout information generating and updating unit determines, based on the result of analysis of the electronic information definition data by said electronic information definition data analyzing unit, the relative geometrical position of link destination electronic information for the link source electronic information of its page in virtual space, and then generates the electronic information layout information having defined the geometrical position; and said electronic information layout information memory unit stores said electronic information layout information.

5. The electronic information browsing apparatus according to claim 4, wherein the electronic information layout information generated by said electronic information layout information generating and updating unit determines electronic information layout so that the link destination electronic information is placed before the link source electronic information in small size scaled smaller than the link source electronic information.

6. The electronic information browsing apparatus according to claim 4, wherein the electronic information layout information generated by said electronic information layout information generating and updating unit determines the electronic information layout so that the link destination electronic information is placed behind the link source electronic information in small size; and said display image generating unit displays the link source electronic information in the half-transparent condition depending on change of visual field and also displays the link destination electronic information behind said link source information through the same information.

7. The electronic information browsing apparatus according to claim 2, wherein said electronic information layout information generating and updating unit generates the electronic information layout information including the information to define page layout of electronic information arranged in virtual space; and electronic information defined to be composed of a plurality of pages in the electronic information definition data and electronic information which cannot be displayed within one page are displayed like a book as a printed matter including a plurality of pages.

8. The electronic information browsing apparatus according to claim 2, wherein the representative electronic information is defined in the electronic information layout information;

the geometrical relationship between the visual field and the representative electronic information is defined in the visual field information; and a geometrical relationship between all pieces of electronic information linked by the link and visual field is defined by the electronic information layout information and the visual field information.

9. The electronic information browsing apparatus according to claim 2, wherein geometrical layout of a link destination electronic information for a link source electronic information or its page and geometrical layout of a page in electronic information are defined, in the electronic information layout information, by defining an electronic information coordinate system of each electronic information, defining a page coordinate system for each page in the electronic information and defining a geometrical relationship among these coordinate systems;

a viewpoint coordinate system is defined in virtual space and a visual field is also defined, under the condition that the origin of the viewpoint coordinate system is defined as a viewpoint position and an image of objects projected onto a virtual screen fixed in the viewpoint coordinate system is defined as the display image of the viewpoint, in the definition of the visual field information;

the reference plane coordinate system and the reference plane fixed to the reference plane coordinate system are defined in the virtual space, the geometrical relationship between the reference plane coordinate system and the electronic information coordinate system of the representative electronic information is defined in the electronic information layout information, and the geometrical layout of the viewpoint coordinate system and reference plane coordinate system is defined in the visual field information; and the visual field for electronic information arranged in the virtual space is continuously changed by continuously changing the geometrical relationship between the viewpoint coordinate system and reference plane coordinate system while fixing the geometrical relationship between the reference plane coordinate system and the electronic information coordinate system of the representative electronic information.

10. The electronic information browsing apparatus according to claim 9, wherein a position of the reference plane coordinate system is set with reference to the position of the representative electronic information in the viewpoint coordinate system when a new representative electronic information is determined; and the setting of the position is performed so that the page surface of the representative electronic information is matched with the reference plane and the representative electronic information as a whole is accommodated within the range of the standard coordinate value of the reference plane coordinate system or is matched with the electronic information coordinate system of the representative electronic information.

11. The electronic information browsing apparatus according to claim 8, wherein said electronic information layout information generating and updating unit administers accuracy and efficiency of the display process, selects the optimum electronic information to obtain the representative electronic information among the linked electronic information, and changes the representative electronic information to select the optimum representative electronic information; and selects optimum electronic information as the representative electronic information, information which reaches all electronic information displayed in the display area by following up the link from said electronic information as the starting point and also provides a standard scale value for the visual field in the electronic information to be displayed.

12. The electronic information browsing apparatus according to claim 11, wherein the representative electronic information is determined by the condition to shift the representative electronic information candidate to the link source when the condition to shift the representative electronic information candidate to the link source or link destination electronic information from the current representative electronic information considered as the representative electronic information candidate is established.

13. The electronic information browsing apparatus according to claim 11, wherein visual field information is normalized, while not changing the display image, by magnifying or reducing the geometrical relationship of the reference plane coordinate system for the viewpoint coordinate system at a center of the viewpoint so that the distance up to the gaze point on the reference plane from the viewpoint in the viewpoint coordinate system becomes equal to the previously determined reference distance after the representative electronic information is changed, and the relationship between the representative electronic information coordinate system and the reference plane coordinate system has been established.

14. The electronic information browsing apparatus according to claim 9, wherein the visual field information includes, as parameters, a position of gaze point on the reference plane, a rotating angle of the reference plane having, as an axis, a straight line passing the gaze point on the reference plane and vertical to the reference plane, a tilt angle defining the rotation of the reference plane having, as the axis, the straight line passing the gaze point on the reference plane and parallel to the horizontal direction of the virtual display area, and a scale ratio of the reference plane coordinate system for the viewpoint coordinate system and visual field angle.

15. The electronic information browsing apparatus according to claim 14, wherein a distance up to the gaze point on the reference plane from the viewpoint is included as a parameter in place of the scale ratio of the reference plane coordinate system for the viewpoint coordinate system.

16. The electronic information browsing apparatus according to claim 14, wherein said visual field information updating unit changes a changing rate per unit time, when the changing rate is measured in the viewpoint coordinate system, of the gaze point on the reference plane as the parameter of the visual field information to be geometrically proportional to the distance up to the gaze point on the reference plane from the viewpoint.

17. The electronic information browsing apparatus according to or claim 9, wherein said user instruction accepting unit accepts the user instruction for turning the pages; and said electronic information layout information generating and updating unit realizes, when a user has issued the instruction to turn the pages, turning of the pages of electronic information displayed as the display image by changing a geometrical relationship of a page coordinate system for the electronic information coordinate system.

18. The electronic information browsing apparatus according to claim 8, wherein said electronic information layout information generating and updating unit and said display image generating unit generate, on the occasion of search by following the link of electronic information from the representative electronic information as the starting point, a link search condition, for the electronic information layout information, to determine whether the search should be continued for the link after a certain electronic information and for determining the condition;

electronic information display priority and page display priority are included as the data items of electronic information layout information;

said electronic information layout information generating and updating unit searches the link of electronic information of the electronic information layout information depending on the link search condition, acquires the electronic information definition data required for generation and update of the electronic information layout information and result of analysis of the same via said electronic information definition data management unit and said electronic information definition data analyzing unit, generates and updates the electronic information layout information and the electronic information layout information generating and updating unit further updates the electronic information layout information, for each electronic information and page, by calculating display priority based on the geometrical relationship for the visual field;

the page image generating unit generates a page image, when the display priority of electronic information and page becomes higher than a certain reference and the page image is not yet arranged on the page image memory unit, based on the electronic information definition data and result of analysis thereof and the page image memory unit stores the generated page image; and said display image generating unit sequentially follows the link of electronic information of the electronic information layout information based on the link search condition, determines whether each electronic information or page should be displayed or not depending on the electronic information display priority and page display priority and then generates the display image depending on the determination.

19. The electronic information browsing apparatus according to claim 2, wherein said display image generating unit displays the electronic information or page having the display priority lower than the predetermined reference in the half-transparent condition and displays the information or page having lower display priority with higher transmitting rate in the half-transparent condition.

20. The electronic information browsing apparatus according to claim 2, wherein said page image generating unit generates page images of a plurality of different resolution for one page and generates pages images of a plurality of different resolution to store the page images in said page image memory unit at the time of page image generation; and said display image generating unit selects the page image, for the page to be displayed, with the resolution to generate the display image in the most excellent efficiency and then uses the page image for display image generation.

21. The electronic information browsing apparatus according to claim 2, wherein said electronic information definition data generating and editing unit generates bookmark data through re-arrangement of a link to the existing electronic information and/or generates the electronic information definition data in response to a user.

22. The electronic information browsing apparatus according to claim 21, wherein said electronic information definition data storing unit stores the electronic information definition data generated by said electronic information definition data generating and editing unit.

23. The electronic information browsing apparatus according to claim 18, wherein said electronic information and page having a higher display priority is displayed preferentially and only the content in the range to enable generation of a display image in the display frame rate obtained depending on the situation is displayed.

24. The electronic information browsing apparatus according to claim 18, wherein said display image generating unit sets, on the occasion of generating a display image, the frame image generating target time to obtain the display image having sufficiently smooth movement considering the visual field changing rate and page turning situation, etc., then obtains a forecasted value of a drawing time required for drawing of electronic information for each electronic information stored in the electronic information layout information memory unit, accumulates the values in the sequence of higher display priority, and determines a threshold value of the display priority to maintain the accumulated values under the frame image generation target time in order to draw only the electronic information and page having the display priority higher than the threshold value.

25. The electronic information browsing apparatus according to claim 24, wherein the frame image generation target time is set short, during the shifting of visual field or turning of the pages, to enable generation of the smooth moving image or is set long when visual field is not shifted and page turning is not conducted.

26. The electronic information browsing apparatus according to claim 18, wherein said display image generating unit sets, on the occasion of generation of display image, the frame image generation target time to obtain the display image including sufficient smooth movement considering visual field changing rate and condition of page turning, and also provides the threshold value of the display priority of electronic information and page during generation of display image in order to draw the electronic information and page having the display priority higher than the threshold value;

the frame image generation time is measured during the drawing operation; and a ratio of the immediately preceding measured value of frame image generation time for the frame image generation target time is obtained and thereby the threshold value is increased or decreased so that the next frame image generation time is accommodated within the target time.

27. The electronic information browsing apparatus according to claim 26, wherein the frame image generation target time is set short, during the shifting of visual field or turning of pages, to enable generation of the smooth moving image or set long when the visual field is not shifted and page turning is not conducted.

28. The electronic information browsing apparatus according to claim 26, wherein when the page image of electronic information to be drawn on the display image is not yet prepared on the page image memory unit in the timing as generating the display image in said display image generating unit, said display image generating unit executes the simplified display operation for displaying only the relevant page without attachment of the page image.

29. The electronic information browsing apparatus according to claim 3, wherein a three-dimensional solid object is included, in addition to the electronic information, as an object defined by the electronic information definition data;

said electronic information layout information generating unit generates, based on the link information defined in the electronic information definition data, the electronic information layout information by determining the relative positional relationship on the occasion of arranging these objects in the virtual space; and said display image generating unit generates the display image including three-dimensional solid object in addition to the electronic information by making reference to the electronic information layout information.

30. A computer readable memory medium on winch a program is recorded for browsing the electronic in which the link information to describe the relationship with the other electronic information is embedded, comprising:

code determining geometrical layout to the virtual space of a group of items of electronic information, by determining geometrical relationships between a source item of electronic information and destination items of electronic information to winch the source of electronic information is linked, based on the link information defined in electronic information definition data;

code defining and updating a visual field to observe said virtual space to generate, based on a visual field definition, the virtual space image including electronic having determined geometrical layout and then output the image to the display device, wherein one of a plurality of linked items of electronic is defined as a representative item of electronic information, and the code defining and updating the visual field defines a geometrical relationship between the visual field and the representative item of electronic information, with the geometrical relationships between the visual field and all items of electronic information in the virtual space being determined and updated based the geometrical relationship between the visual field and the representative item of electronic and on the geometrical relationships between the source item of electronic information and the destination items of electronic information as determined by the code determining layout; and code continuously changing the geometrical positional relationship between the electronic information and the visual field in said virtual space on the user instruction input and then continuously generating, on a realtime basis, the image based on the visual field and outputting the image to the display devise.

31. The computer readable memory medium according to claim 30, comprising:

electronic information data acquiring code to acquire the electronic information definition data from a network;

electronic information definition data storing code to store the electronic information defining data acquired from said electronic information definition data acquiring code or electronic information definition data generate by said code determining geometrical layout; wherein:

geometrical layout of a link destination electronic information for a link source electronic information or its page and geometrical layout of a page in electronic information are defined, in the electronic information layout information, by defining an electronic information coordinate system of each electronic information, defining a page coordinate system for each page in the electronic information and defining a geometrical relationship among these coordinate systems;

a viewpoint coordinate system is defined in virtual space and a visual field is also defined, under the condition that the origin of the viewpoint coordinate system is defined as a viewpoint position and an image of objects projected onto a virtual screen fixed in the viewpoint coordinate system is defined as the display image of the viewpoint, in the definition of the visual field information;

the reference plane coordinate system and the reference plane fixed to the reference plane coordinate system are defined in the virtual space, the geometrical relationship between the reference plane coordinate system and the electronic information coordinate system of the representative electronic information is defined in the electronic information layout information, and the geometrical layout of the viewpoint coordinate system and reference plane coordinate system is defined in the visual field information; and the visual field for electronic information arranged in the virtual space is continuously changed by continuously changing the geometrical relationship between the viewpoint coordinate system and reference plane coordinate system while fixing the geometrical relationship between the reference plane coordinate system and the electronic information coordinate system of the representative electronic information.

electronic information definition date memory code to temporarily store the electronic information definition data for referring thereto from electronic information definition data analyzing code and page image generating code;

electronic information definition data management code to administrate the electronic information data to by store in said electronic information definition data storing data acquiring code, and then to administrate and distribute requested electronic information definition data requested by another code;

electronic information definition data analyzing code to administrate the electronic information definition data and acquire the information to be used for generation of a page image and electronic information layout information;

page image generating code to generate each page image of electronic information using the electronic information data and a corresponding analysis result;

page image memory code to temporarily store the page image generated by said page image generating code;

used instruction averting code to accept an instruction from a user and then transfer the instruction to another code;

electronic information layout information code store electronic information layout information to define the information concerning layout in a virtual space of electronic information linked by a hypertext format or other link definition information formats;

electronic information layout information generating and updating code to generate electronic information layout base on the result of analysis of the electronic information definition data and then update electronic information layout information depending on a change of visual field information;

visual field information memory code to store visual field information to define the area as the object of display image generation in virtual space;

visual field information updating code to update visual field information based on user instruction accepted by said user instruction accepting code;

display image memory code to temporarily store the display image generated by said display image generating code; and image outputting code to continuously output display the image stored in said display image memory code, wherein said display image generating code continuously generates the display image using a page image based on the electronic information layout information and the visual field information.

32. The computer-readable memory medium according to claim 31, wherein:

said visual field information updating code charges thee-dimensionally and continuously the geometrical relationship between the visual field and electronic information based on user instruction;

said display image generating code further draws the page on winch a page image is attached to the display image at a high sapped through perspective transformation; and said display image generating code generates the continuously changing display image based on the relationship between the continuously changing visual field and electronic information in real time.

33. The computer-readable memory medium according to claim 31, wherein:

said electronic information layout information generating and updating code determines, based on the result of analysis of the electronic information definition data by said electronic information definition data analyzing code, relative geometrical position of link destination electronic information for the link source electronic information of its page, and then generated the electronic information layout information having defined the geometrical position; and said electronic information layout information memory code stores electronic information layout information.

34. The computer-readable memory medium according to claim 33, wherein:

the electronic information layout information generated by said electronic information layout information generating and updating code determines electronic information layout so that the link destination electronic information is placed before the link source electronic information in small size scaled smaller than the link source electronic information.

35. The computer-readable memory medium according to claim 33, wherein:

the electronic information layout information generated by said electronic information layout information generating and updating code determines the electronic information layout so that the link destination electronic information is placed behind the link source electronic information in small size; and said display image generating code displays the link source electronic information in the half-transparent condition depending on change of visual field and also displays the link destination electronic information behind said link source information through the same information.

36. The computer-readable memory medium according to claim 31, wherein:

said electronic information layout information generating and updating code generates the electronic information layout information including the information to define page layout of electronic information arranged in virtual space; and electronic information defined to be composed of a plurality of pages in the electronic information definition data and electronic information which cannot be displayed within one page are displayed like a book as a printed matter including a plurality of pages.

37. The computer-readable memory medium according to claim 31, wherein:

the representative electronic information is defined in the electronic information layout information;

a the geometrical relationship between the visual field and the representative electronic information is defined in the visual field information; and a geometrical relationship between all pieces of electronic information linked by the link and visual field is defined by the electronic information layout information and the visual field information.

38. The computer-readable memory medium according to claim 31, wherein:

geometrical layout of a link destination electronic information for a link source electronic information or its page and geometrical layout of a page in electronic information are defined, in the electronic information layout information, by defining an electronic information coordinate system of each electronic information, defining a page coordinate system for each page in the electronic information and defining a geometrical relationship among these coordinate systems;

a viewpoint coordinate system is defined in virtual space and a visual field is also defined, under the condition that the origin of the viewpoint coordinate system is defined as a viewpoint position and an image of objects projected onto a virtual screen fixed in the viewpoint coordinate system is defined as the display image of the viewpoint, in the definition of the visual field information;

the reference plane coordinate system and the reference plane fixed to the reference plane coordinate system are defined in the virtual space, the geometrical relationship between the reference plane coordinate system and the electronic information coordinate system of the representative electronic information is defined in the electronic information layout information, and the geometrical layout of the viewpoint coordinate system and reference plane coordinate system is defined in the visual field information; and the visual field for electronic information arranged in the virtual space is continuously changed by continuously changing the geometrical relationship between the viewpoint coordinate system and reference plane coordinate system while fixing the geometrical relationship between the reference plane coordinate system and the electronic information coordinate system of the representative electronic information.

39. The computer-readable memory medium according to claim 38, wherein:

a position of the reference plane coordinate system is set with reference to the position of the representative electronic information in the viewpoint coordinate system when a new representative electronic information is determined; and the setting of the position is performed so that the page surface of the representative electronic information is matched with the reference plane and the representative electronic information as a whole is accommodated within the range of the standard coordinate value of the reference plane coordinate system or is matched with the electronic information coordinate system of the representative electronic information.

40. The computer-readable memory medium according to claim 37, wherein said electronic information layout information generating and updating code:

administers accuracy and efficiency of the display process, selects the optimum electronic information to obtain the representative electronic information among the linked electronic information, and changes the representative electronic information to select the optimum representative electronic information; and selects optimum electronic information as the representative electronic information, information which reaches all electronic information displayed in the display area by following up the link from said electronic information as the starting point and also provides a standard scale value for the visual field in the electronic information to be displayed.

41. The computer-readable memory medium according to claim 40, wherein:

the representative electronic information is determined by the condition to shift the representative electronic information candidate to the link source when the condition to shift the representative electronic information candidate to the link source or link destination electronic information from the current representative electronic information considered as the representative electronic information candidate is established.

42. The computer-readable memory medium according to claim 40, wherein visual field information is normalized, while not changing the display image, by magnifying or reducing the geometrical relationship of the reference plane coordinate system for the viewpoint coordinate system at a center of the viewpoint so that the distance up to the gaze point on the reference plane from the viewpoint in the viewpoint coordinate system becomes equal to the previously determined reference distance after the representative electronic information is changed, and the relationship between the representative electronic information coordinate system and the reference plane coordinate system has been established.

43. The computer-readable memory medium according to claim 38, wherein:

the visual field information includes, as parameters, a position of gaze point on the reference plane, a rotating angle of the reference plane having, as an axis, a straight line passing the gaze point on the reference plane and vertical to the reference plane, a tilt angle defining the rotation of the reference plane having, as the axis, the straight line passing the gaze point on the reference plane and parallel to the horizontal direction of the virtual display area, and a scale ratio of the reference plane coordinate system for the viewpoint coordinate system and visual field angle.

44. The computer-readable memory medium according to claim 43, wherein a distance up to the gaze point on the reference plane from the viewpoint is included as a parameter in place of the scale ratio of the reference plane coordinate system for the viewpoint coordinate system.

45. The computer-readable memory medium according to claim 43, wherein said visual field information updating code changes a changing rate per code time, when the changing rate is measured in the viewpoint coordinate system, of the gaze point on the reference plane as the parameter of the visual field information to be geometrically proportional to the distance up to the gaze point on the reference plane from the viewpoint.

46. The computer-readable memory medium according to claim 38, wherein:

said user instruction accepting code accepts the user instruction for turning the pages; and said electronic information layout information generating and updating code realizes, when a user has issued the instruction to turn the pages, turning of the pages of electronic information displayed as the display image by changing a geometrical relationship of a page coordinate system for the electronic information coordinate system.

47. The computer-readable memory medium according to claim 37, wherein:

said electronic information layout information generating and updating code and said display image generating code generate, on the occasion of search by following the link of electronic information from the representative electronic information as the starting point, a link search condition, for the electronic information layout information, to determine whether the search should be continued for the link after a certain electronic information and for determining the condition;

electronic information display priority and page display priority are included as the data items of electronic information layout information;

said electronic information layout information generating and updating code searches the link of electronic information of the electronic information layout information depending on the link search condition, acquires the electronic information definition data required for generation and update of the electronic information layout information and result of analysis of the same via said electronic information definition data management code and said electronic information definition data analyzing code, generates and updates the electronic information layout information and the electronic information layout information generating and updating code further updates the electronic information layout information, for each electronic information and page, by calculating display priority based on the geometrical relationship for the visual field;

the page image generating code generates a page image, when the display priority of electronic information and page becomes higher than a certain reference and the page image is not yet arranged on the page image memory code, based on the electronic information definition data and result of analysis thereof and the page image memory code stores the generated page image; and said display image generating code sequentially follows the link of electronic information of the electronic information layout information based on the link search condition, determines whether each electronic information or page should be displayed or not depending on the electronic information display priority and page display priority and then generates the display image depending on the determination.

48. The computer-readable memory medium according to claim 47, wherein said display image generating code displays the electronic information or page having the display priority lower than the predetermined reference in the half-transparent condition and displays the information or page having lower display priority with higher transmitting rate in the half-transparent condition.

49. The computer-readable memory medium according to claim 31, wherein:

said page image generating code generates page images of a plurality of different resolution for one page and generates pages images of a plurality of different resolution to store the page images in said page image memory code at the time of page image generation; and said display image generating code selects the page image, for the page to be displayed, with the resolution to generate the display image in the most excellent efficiency and then uses the page image for display image generation.

50. The computer-readable memory medium according to claim 31, wherein said electronic information definition data generating and editing code generates bookmark data through re-arrangement of a link to the existing electronic information and/or generates the electronic information definition data in response to a user.

51. The computer-readable memory medium according to claim 50, wherein said electronic information definition data storing code stores the electronic information definition data generated by said electronic information definition data generating and editing code.

52. The computer-readable memory medium according to claim 47, wherein said electronic information and page having a higher display priority is displayed preferentially and only the content in the range to enable generation of a display image in the display frame rate obtained depending on the situation is displayed.

53. The computer-readable memory medium according to claim 47, wherein said display image generating code sets, on the occasion of generating a display image, the frame image generating target time to obtain the display image having sufficiently smooth movement considering the visual field changing rate and page turning situation, etc., then obtains a forecasted value of a drawing time required for drawing of electronic information for each electronic information stored in the electronic information layout information memory code, accumulates the values in the sequence of higher display priority, and determines a threshold value of the display priority to maintain the accumulated values under the frame image generation target time in order to draw only the electronic information and page having the display priority higher than the threshold value.

54. The computer-readable memory medium according to claim 53, wherein the frame image generation target time is set short, during the shifting of visual field or turning of the pages, to enable generation of the smooth moving image or is set long when visual field is not shifted and page turning is not conducted.

55. The computer-readable memory medium according to claim 47, wherein:

said display image generating code sets, on the occasion of generation of display image, the frame image generation target time to obtain the display image including sufficient smooth movement considering visual field changing rate and condition of page turning, and also provides the threshold value of the display priority of electronic information and page during generation of display image in order to draw the electronic information and page having the display priority higher than the threshold value;

the frame image generation time is measured during the drawing operation; and a ratio of the immediately preceding measured value of frame image generation time for the frame image generation target time is obtained and thereby the threshold value is increased or decreased so that the next frame image generation time is accommodated within the target time.

56. The computer-readable memory medium according to claim 55, wherein the frame image generation target time is set short, during the shifting of visual field or turning of pages, to enable generation of the smooth moving image or set long when the visual field is not shifted and page turning is not conducted.

57. The computer-readable memory medium according to claim 55, wherein when the page image of electronic information to be drawn on the display image is not yet prepared on the page image memory code in the timing as generating the display image in said display image generating code, said display image generating code executes the simplified display operation for displaying only the relevant page without attachment of the page image.

58. The computer-readable memory medium according to claim 32, wherein:

a three-dimensional solid object is included, in addition to the electronic information, as an object defined by the electronic information definition data;

said electronic information layout information generating code generates, based on the link information defined in the electronic information definition data, the electronic information layout information by determining the relative positional relationship on the occasion of arranging these objects in the virtual space; and said display image generating code generates the display image including three-dimensional solid object in addition to the electronic information by making reference to the electronic information layout information.

* * * * *

UNITED STATES PATENT AND TRADEMARK OFFICE
CERTIFICATE OF CORRECTION

PATENT NO. : 6,650,343 B1
DATED : November 18, 2003
INVENTOR(S) : Takushi Fujita et al.

It is certified that error appears in the above-identified patent and that said Letters Patent is hereby corrected as shown below:

<u>Title page,</u>
Item [57], ABSTRACT,
Line 1, change "electrgonic" to -- electronic --.

Signed and Sealed this

Twenty-fourth Day of February, 2004

JON W. DUDAS
*Acting Director of the United States Patent and Trademark Office*